(12) United States Patent
Lai et al.

(10) Patent No.: US 11,816,243 B2
(45) Date of Patent: Nov. 14, 2023

(54) PRESERVING USER-ENTITY DIFFERENTIAL PRIVACY IN NATURAL LANGUAGE MODELING

(71) Applicant: Adobe Inc., San Jose, CA (US)

(72) Inventors: Thi Kim Phung Lai, Kearny, NJ (US); Tong Sun, San Jose, CA (US); Rajiv Jain, Vienna, VA (US); Nikolaos Barmpalios, Palo Alto, CA (US); Jiuxiang Gu, College Park, MD (US); Franck Dernoncourt, Sunnyvale, CA (US)

(73) Assignee: Adobe Inc., San Jose, CA (US)

(*) Notice: Subject to any disclaimer, the term of this patent is extended or adjusted under 35 U.S.C. 154(b) by 183 days.

(21) Appl. No.: 17/397,407

(22) Filed: Aug. 9, 2021

(65) Prior Publication Data
US 2023/0059367 A1    Feb. 23, 2023

(51) Int. Cl.
*G06F 21/62* (2013.01)
*G06N 20/00* (2019.01)
*G06F 40/295* (2020.01)

(52) U.S. Cl.
CPC ........ *G06F 21/6245* (2013.01); *G06F 40/295* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 2019/0227980 A1* | 7/2019 | McMahan | G06N 20/00 |
| 2021/0073678 A1* | 3/2021 | Chu | G06N 20/00 |
| 2021/0374605 A1* | 12/2021 | Qian | G06F 21/6263 |
| 2022/0108213 A1* | 4/2022 | Cao | G06N 3/084 |

OTHER PUBLICATIONS

Abadi, M., Chu, A., Goodfellow, I., McMahan, H., Mironov, I., Talwar, K., and Zhang, L. Deep learning with differential privacy. In ACM SIGSAC Conference on Computer and Communications Security, pp. 308-318, 2016.

(Continued)

*Primary Examiner* — Alexander Lagor
*Assistant Examiner* — Felicia Farrow
(74) *Attorney, Agent, or Firm* — Keller Preece PLLC

(57) ABSTRACT

Systems, methods, and non-transitory computer-readable media can generate a natural language model that provides user-entity differential privacy. For example, in one or more embodiments, a system samples sensitive data points from a natural language dataset. Using the sampled sensitive data points, the system determines gradient values corresponding to the natural language model. Further, the system generates noise for the natural language model. The system generates parameters for the natural language model using the gradient values and the noise, facilitating simultaneous protection of the users and sensitive entities associated with the natural language dataset. In some implementations, the system generates the natural language model through an iterative process (e.g., by iteratively modifying the parameters).

20 Claims, 11 Drawing Sheets

(56) References Cited

OTHER PUBLICATIONS

Alnemari, A., Romanowski, C., and Raj, R. An adaptive differential privacy algorithm for range queries over healthcare data. In 2017 IEEE International Conference on Healthcare Informatics (ICHI), pp. 397-402, 2017.
Asi, H., Duchi, J., and Javidbakht, O. Element level differential privacy: The right granularity of privacy. arXiv preprint arXiv:1912.04042, 2019.
Augenstein, S., McMahan, H., Ramage, D., Ramaswamy, S., Kairouz, P., Chen, M., Mathews, R., et al. Generative models for effective ml on private, decentralized datasets. arXiv preprint arXiv:1911.06679, 2019.
Bagdasaryan, E., Poursaeed, O., and Shmatikov, V. Differential privacy has disparate impact on model accuracy. In Advances in Neural Information Processing Systems (NeurIPS), pp. 15479-15488, 2019.
Balasuriya, D., Ringland, N., Nothman, J., Murphy, T., and Curran, J. Named entity recognition in wikipedia. In Proceedings of the 2009 Workshop on the People's Web Meets NLP: Collaboratively Constructed Semantic Resources, pp. 10-18, 2009.
Bassily, R., Smith, A., and Thakurta, A. Private empirical risk minimization: Efficient algorithms and tight error bounds. In 2014 IEEE 55th Annual Symposium on Foundations of Computer Science, pp. 464-473, 2014.
Beaulieu-Jones, B., Yuan, W., Finlayson, S., and Wu, Z. Privacy-preserving distributed deep learning for clinical data. arXiv preprint arXiv:1812.01484, 2018.
Bengio, Y., Ducharme, R., Vincent, P., and Jauvin, C. A neural probabilistic language model. Journal of Machine Learning Research, 3(Feb):1137-1155, 2003.
Bonawitz, K., Eichner, H., Grieskamp, W., Huba, D., Ingerman, A., Ivanov, V., Kiddon, C., Konecny, J., Mazzocchi, S., McMahan, H., et al. Towards federated learning at scale: System design. arXiv preprint arXiv:1902.01046, 2019.
Carlini, N., Tramer, F., Wallace, E., Jagielski, M., Herbert-Voss, A., Lee, K., Roberts, A., Brown, T., Song, D., Erlingsson, U., et al. Extracting training data from large lan-guage models. arXiv preprint arXiv:2012.07805, 2020.
Chen, S., Beeferman, D., and Rosenfeld, R. Evaluation metrics for language models. 1998.
Derczynski, L., Nichols, E., van Erp, M., and Limsopatham, N. Results of the WNUT2017 shared task on novel and emerging entity recognition. In Proceedings of the 3rd Workshop on Noisy User-generated Text, pp. 140-147, 2017.
Dernoncourt, F., Lee, J., Uzuner, O., and Szolovits, P. Deidentification of patient notes with recurrent neural networks. Journal of the American Medical Informatics Association, 24(3):596-606, 2017.
Dinur, I. and Nissim, K. Revealing information while preserving privacy. In Proceedings of the 22nd ACM SIGMOD-SIGACT-SIGART Symposium on Principles of Database Systems, pp. 202-210, 2003.
Dwork, C., McSherry, F., Nissim, K., and Smith, A. Calibrating noise to sensitivity in private data analysis. In Theory of Cryptography Conference, pp. 265-284, 2006.
Dwork, C., Roth, A., et al. The algorithmic foundations of differential privacy. Foundations and Trends in Theoretical Computer Science, 9(3-4):211-407, 2014.
Fan, L. Image pixelization with differential privacy. In IFIP Annual Conference on Data and Applications Security and Privacy, pp. 148-162, 2018.
Fredrikson, M., Jha, S., and Ristenpart, T. Model inversion attacks that exploit confidence information and basic countermeasures. In Proceedings of the 22nd ACM SIGSAC Conference on Computer and Communications Security, pp. 1322-1333, 2015.
Gong, M., Pan, K., Xie, Y., Qin, A., and Tang, Z. Preserving differential privacy in deep neural networks with relevance-based adaptive noise imposition. Neural Net-works, 125:131-141, 2020.
Grishman, R. and Sundheim, B. Message understanding conference-6: A brief history. In COLING 1996 vol. 1: The 16th International Conference on Computational Linguistics, 1996.
Hitaj, B., Ateniese, G., and Perez-Cruz, F. Deep models under the gan: information leakage from collaborative deep learning. In Proceedings of the 2017 ACM SIGSAC Conference on Computer and Communications Security, pp. 603-618, 2017.
Honnibal, M. and Montani, I. Spacy 2: Natural language understanding with bloom embeddings, convolutional neural networks and incremental parsing. To appear, 7 (1), 2017.
Kamp, M., Adilova, L., Sicking, J., Huger, F., Schlicht, P., Wirtz, T., and Wrobel, S. Efficient decentralized deep learning by dynamic model averaging. In Joint European Conference on Machine Learning and Knowledge Discovery in Databases, pp. 393-409, 2018.
Kartal, H., Liu, X., and Li, X. Differential privacy for the vast majority. ACM Transactions on Management Information Systems (TMIS), 10(2):1-15, 2019.
Kifer, D. and Machanavajjhala, A. No free lunch in data privacy. In Proceedings of the 2011 ACM SIGMOD International Conference on Management of Data, pp. 193-204, 2011.
Lee, J. and Kifer, D. Concentrated differentially private gradient descent with adaptive per-iteration privacy budget. In Proceedings of the 24th ACM SIGKDD International Conference on Knowledge Discovery & Data Mining, pp. 1656-1665, 2018.
Li, N., Qardaji, W., and Su, D. On sampling, anonymization, and differential privacy or, k-anonymization meets differential privacy. In Proceedings of the 7th ACM Symposium on Information, Computer and Communications Security, pp. 32-33, 2012.
Lim, S., Muis, A., Lu, W., and Ong, C. Malwaretextdb: A database for annotated malware articles. In Proceedings of the 55th Annual Meeting of the Association for Computational Linguistics (vol. 1: Long Papers), pp. 1557-1567, 2017.
Liu, B. and Lane, I. Multi-domain adversarial learning for slot filling in spoken language understanding. arXiv preprint arXiv:1711.11310, 2017.
McMahan, H., Moore, E., Ramage, D., and y Arcas, B. Federated learning of deep networks using model averaging. arXiv preprint arXiv:1602.05629, 2016.
McMahan, H., Ramage, D., Talwar, K., and Zhang, L. Learning differentially private recurrent language models. arXiv preprint arXiv:1710.06963, 2017.
Merity, S. Single headed attention rnn: Stop thinking with your head. arXiv preprint arXiv:1911.11423, 2019.
Merity, S., Keskar, N. S., and Socher, R. Regularizing and optimizing LSTM language models. arXiv preprint arXiv:1708.02182, 2017.
Mikolov, T., Deoras, A., Kombrink, S., Burget, L., and Cernocky, J. Empirical evaluation and combination of advanced language modeling techniques. In International Speech Communication Association, 2011a.
Mikolov, T., Kombrink, S., Burget, L., Cernocky, J., and Khudanpur, S. Extensions of recurrent neural network language model. In 2011 IEEE International Conference on Acoustics, Speech and Signal Processing (ICASSP), pp. 5528-5531, 2011b.
Mironov, I. Renyi differential privacy. In 2017 IEEE 30th Computer Security Foundations Symposium (CSF), pp. 263-275, 2017.
Moussa, M. and Demurjian, S. Differential privacy approach for big data privacy in healthcare. In Privacy and Security Policies in Big Data, pp. 191-213. 2017.
Ou, L., Qin, Z., Liao, S., Hong, Y., and Jia, X. Releasing correlated trajectories: Towards high utility and optimal differential privacy. IEEE Transactions on Dependable and Secure Computing, 2018.
Pan, X., Zhang, M., Ji, S., and Yang, M. Privacy risks of general-purpose language models. In 2020 IEEE Symposium on Security and Privacy (SP), pp. 1314-1331, 2020.
Papernot, N., Abadi, M., Erlingsson, U., Goodfellow, I., and Talwar, K. Semi-supervised knowledge transfer for deep learning from private training data. arXiv preprint arXiv:1610.05755, 2016.
Phan, N., Wang, Y., Wu, X., and Dou, D. Differential privacy preservation for deep auto-encoders: an application of human behavior prediction. In AIII, vol. 16, pp. 1309-1316, 2016.

(56) References Cited

OTHER PUBLICATIONS

Phan, N., Vu, M., Liu, Y., Jin, R., Dou, D., Wu, X., and Thai, M. Heterogeneous gaussian mechanism: Preserving differential privacy in deep learning with provable robustness. arXiv preprint arXiv:1906.01444, 2019.

Phan, N., Thai, M., Hu, H., Jin, R., Sun, T., and Dou, D. Scalable differential privacy with certified robustness in adversarial learning. In International Conference on Machine Learning, pp. 7683-7694, 2020.

Qi, P., Zhang, Y., Zhang, Y., Bolton, J., and Manning, C. Stanza: A python natural language processing toolkit for many human languages. arXiv preprint arXiv:2003.07082, 2020.

Roth, A. Buying private data at auction: the sensitive surveyor's problem. ACM SIGecom Exchanges, 11(1):1-8, 2012.

Salem, A., Zhang, Y., Humbert, M., Berrang, P., Fritz, M., and Backes, M. Ml-leaks: Model and data independent membership inference attacks and defenses on machine learning models. arXiv preprint arXiv:1806.01246, 2018.

Sang, E. and De Meulder, F. Introduction to the conll—2003 shared task: Language-independent named entity recognition. arXiv preprint cs/0306050, 2003.

Shetty, R., Schiele, B., and Fritz, M. A4NT: author attribute anonymity by adversarial training of neural machine translation. In 27th Security Symposium, pp. 1633-1650, 2018.

Shokri, R. and Shmatikov, V. Privacy-preserving deep learning. In Proceedings of the 22nd ACM SIGSAC Conference on Computer and Communications Security, pp. 1310-1321, 2015.

Shokri, R., Stronati, M., Song, C., and Shmatikov, V. Membership inference attacks against machine learning models. In 2017 IEEE Symposium on Security and Privacy (SP), pp. 3-18, 2017.

Stubbs, A., Kotfila, C., and Uzuner, O. Automated systems for the de-identification of longitudinal clinical narratives: Overview of 2014 i2b2/uthealth shared task track 1. Journal of Biomedical Informatics, 58:S11-S19, 2015.

Sun, L. and Lyu, L. Federated model distillation with noise-free differential privacy. arXiv preprint arXiv:2009.05537, 2020.

Tramer, F., Zhang, F., Juels, A., Reiter, M., and Ristenpart, T. Stealing machine learning models via prediction apis. In 25th {USENIX} Security Symposium, pp. 601-618, 2016.

Wan, L., Zeiler, M., Zhang, S., LeCun, Y., and Fergus, R. Regularization of neural networks using dropconnect. In International conference on machine learning (ICML), pp. 1058-1066, 2013.

Wang, S. and Sinnott, R. Protecting personal trajectories of social media users through differential privacy. Computers & Security, 67:142-163, 2017.

Weischedel, R., Pradhan, S., Ramshaw, L., Palmer, M., Xue, N., Marcus, M., Taylor, A., Greenberg, C., Hovy, E., Belvin, R., et al. Ontonotes release 4.0. LDC2011T03, Philadelphia, Penn.: Linguistic Data Consortium, 2011.

Wu, N., Farokhi, F., Smith, D., and K., M. A. The value of collaboration in convex machine learning with differential privacy. arXiv preprint arXiv:1906.09679, 2019.

Wu, X., Li, F., Kumar, A., Chaudhuri, K., Jha, S., and Naughton, J. Bolt-on differential privacy for scalable stochastic gradient descent-based analytics. In ACM International Conference on Management of Data, pp. 1307-1322, 2017.

Yeom, S., Giacomelli, I., Fredrikson, M., and Jha, S. Privacy risk in machine learning: Analyzing the connection to overfitting. In 2018 IEEE 31st Computer Security Foundations Symposium (CSF), pp. 268-282, 2018.

Yu, L., Liu, L., Pu, C., Gursoy, M., and Truex, S. Differentially private model publishing for deep learning. In 2019 IEEE Symposium on Security and Privacy (SP), pp. 332-349, 2019.

Zhao, L., Zhang, Y., Wang, Q., Chen, Y., Wang, C., and Zou, Q. Privacy-preserving collaborative deep learning with irregular participants. arXiv preprint arXiv:1812.10113, 2018.

Zhu, T., Li, G., Zhou, W., and Philip, S. Differential privacy and applications. 2017.

Zhu, Y. and Wang, Y. Poission subsampled renyidifferential privacy. In International Conference on Machine Learning (ICML), pp. 7634-7642, 2019.

Zia, M., Khan, M., and El-Sayed, H. Application of differential privacy approach in healthcare data—a case study. In 2020 14th International Conference on Innovations in Information Technology (IIT), pp. 35-39, 2020.

\* cited by examiner

|  |  |
|---|---|
| $|\mathcal{V}|$ | 8,882 |
| # of samples | 14,040 |
| # of users | 946 |
| # of sensitive samples | Org 5,187 |
| | Person 4,406 |
| | All 9,176 |

*Fig. 5A*

PRESERVING USER-ENTITY DIFFERENTIAL PRIVACY IN NATURAL LANGUAGE MODELING

BACKGROUND

Recent years have seen significant advancement in hardware and software platforms for protecting the privacy of sensitive data. Indeed, as data is increasingly collected (e.g., from users or other entities) and leveraged to improve the features offered by a product or service, systems have developed to protect the sensitive information associated with data-such as by limiting the information that can be leaked about the data. For instance, many conventional systems implement differential privacy models that limit the information that can be inferred about data that is utilized to train a machine learning model to perform some function (e.g., via an analysis of the model parameters, a membership inference attack, and/or keyword inference). Although conventional differential privacy systems can provide some protection for data, such systems are often inflexible in that they are rigidly limited in the type of data that is protected. Further, conventional differential privacy systems typically fail to provide an effective balance between data privacy and model accuracy.

SUMMARY

One or more embodiments described herein provide benefits and/or solve one or more problems in the art with systems, methods, and non-transitory computer-readable media that flexibly implement user-entity differential privacy for securing data used in natural language modeling. In particular, in one or more embodiments, a system utilizes a dataset to generate a natural language model to operate in accordance with a differential privacy rule corresponding to user-entity adjacent databases. Accordingly, in one or more embodiments, the system generates the natural language model to perform a natural language task while protecting both the participation information of data owners (e.g., users) and the sensitive textual information (e.g., sensitive entities) represented in the dataset. To illustrate, in one or more instances, the system optimizes the trade-off of privacy loss and model utility with a tight sensitivity bound. In particular, the system utilizes a noise scale derived from both user information and sensitive entity information to inject random Gaussian noise into the parameters of the natural language model. In this manner, the system flexibly provides simultaneous protection of a variety of data types. Further, the system generates balanced models that perform accurately while providing effective data security.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 5A-5B illustrate graphical representations reflecting tools used in determining the effectiveness of the user-entity differential privacy system in accordance with one or more embodiments;

DETAILED DESCRIPTION

Figure 1:
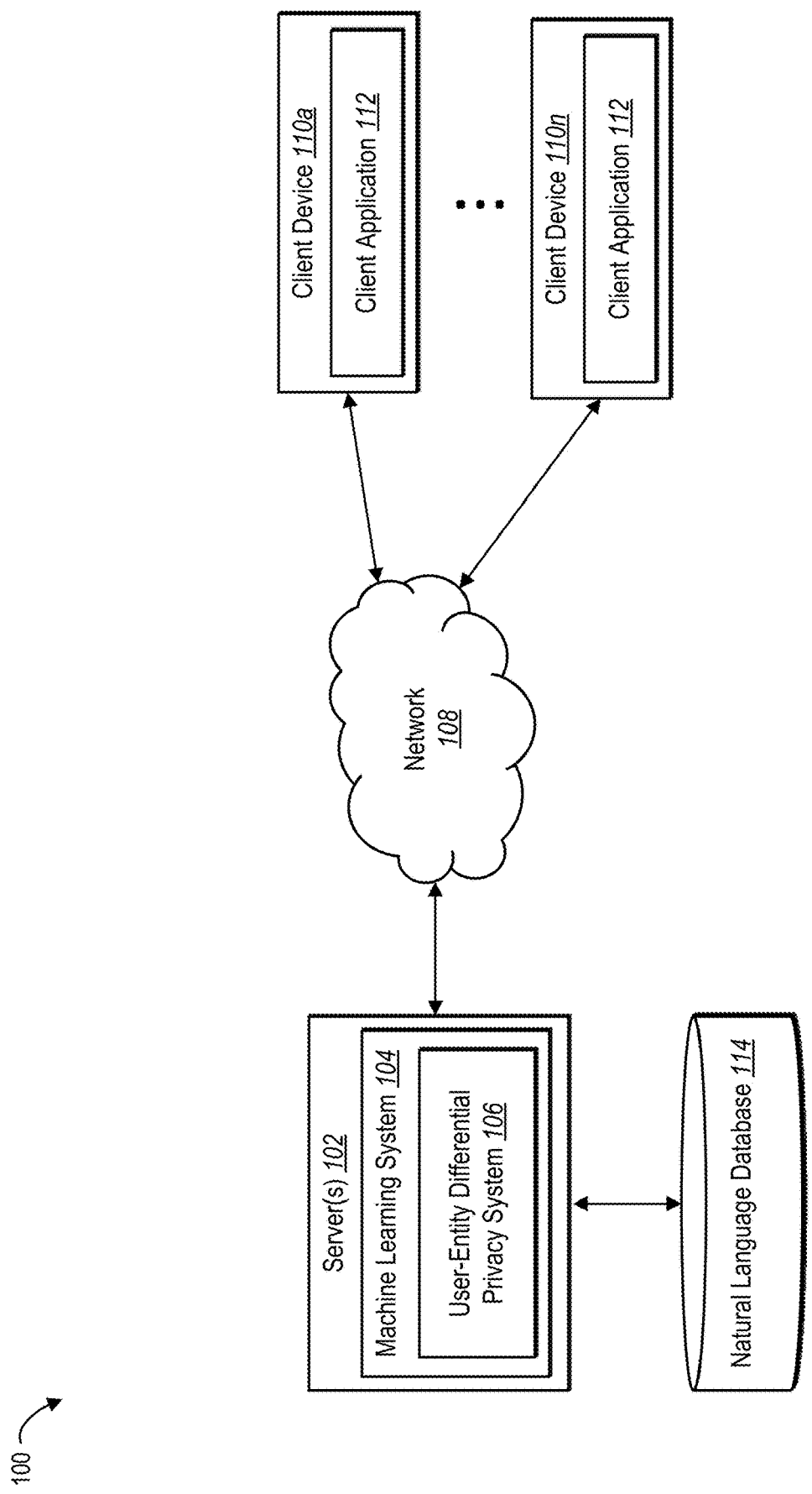
FIG. 1 illustrates an example environment in which a user-entity differential privacy system can operate in accordance with one or more embodiments.

One or more embodiments described herein include a user-entity differential privacy system for flexibly and simultaneously providing protection for both users and sensitive entities represented within a dataset via user-entity differential privacy. Indeed, in one or more embodiments, the user-entity differential privacy system generates a natural language model to perform a natural language task while protecting sensitive information associated with a dataset with which the natural language model is learned. For instance, in some implementations, the user-entity differential privacy system injects noise into the parameters of the natural language model. In some cases, the user-entity differential privacy system generates the noise based on a sensitivity bound associated with samples of both data owners (e.g., users) and textual information (e.g., sensitive entities) represented in the dataset. With the noisy parameters, the natural language model generates outcomes in accordance with a differential privacy rule that corresponds to user-entity adjacent databases (e.g., databases that differ in a single user and a single sensitive entity).

To provide an illustration, in one or more embodiments, the user-entity differential privacy system determines, from a natural language dataset, a set of sensitive data points associated with one or more users and comprising at least one sensitive entity. The user-entity differential privacy system further generates, utilizing the set of sensitive data points, a natural language model that provides user-entity differential privacy for the one or more users and the at least one sensitive entity. For instance, the user-entity differential privacy system determines an average gradient corresponding to the set of sensitive data points using a user-entity estimator. Further, the user-entity differential privacy system determines a noise scale for the user-entity estimator. Using the average gradient and the noise scale, the user-entity differential privacy system generates parameters for the natural language model.

As just mentioned, in one or more embodiments, the user-entity differential privacy system generates a natural language model utilizing a natural language dataset. In some implementations, the natural language dataset includes a plurality of natural language texts associated with (e.g., contributed by) a plurality of users. In some cases, the natural language texts include (e.g., reference) one or more sensitive entities (e.g., a person or a location to be protected).

As further mentioned, in some embodiments, the user-entity differential privacy system determines a set of sensitive data points (e.g., a set of samples) from the natural language dataset. In particular, the user-entity differential privacy system determines natural language texts that are associated with one or more of the users and include one or more of the sensitive entities represented within the natural language dataset. In one or more embodiments, the user-entity differential privacy system determines the set of sensitive data points using a user sampling rate and a sensitive entity sampling rate.

Additionally, as mentioned above, in some implementations, the user-entity differential privacy system utilizes the set of sensitive data points to generate the natural language model. In particular, the user-entity differential privacy system generates the natural language model to perform a natural language task while simultaneously protecting the users and the sensitive entities represented within the natural language dataset. For instance, in some cases, the user-entity differential privacy system generates the natural language model to provide outputs in accordance with a user-entity differential privacy rule that facilitates the protection of both users and sensitive entities. In some instances, the user-entity differential privacy rule corresponds to the production of model outputs in the context of user-entity adjacent databases-a pair of databases that differs in a single user and a single sensitive entity.

In one or more embodiments, the user-entity differential privacy system generates the natural language model by determining an average gradient corresponding to the set of sensitive data points. In particular, in some embodiments, the user-entity differential privacy rule generates one or more gradients corresponding to parameters of the natural language model for each user represented in the set of sensitive data points. Further, the user-entity differential privacy rule determines the average gradient using the one or more gradients determined for each user. In some implementations, the user-entity differential privacy rule determines the average gradient using a user-entity estimator. In some cases, the user-entity estimator determines the average gradient based on the user sampling rate, the sensitive entity sampling rate, a first set of weights corresponding to the users represented in the set of sensitive data points, and a second set of weights corresponding to the sensitive entities represented in the set of sensitive data points.

In some implementations, the user-entity differential privacy system further generates a noise scale for the user-entity estimator. To illustrate, in some cases, the user-entity differential privacy system determines a sensitivity bound for the user-entity estimator using the user sampling rate, the sensitive entity sampling rate, and the first and second sets of weights. In some implementations, the user-entity differential privacy system generates Gaussian noise using the noise scale.

Further, in some instances, the user-entity differential privacy system generates one or more parameters for the natural language model. In particular, the user-entity differential privacy system generates the one or more parameters using the average gradient and the noise scale (e.g., the Gaussian noise generated from the noise scale). In some cases, the user-entity differential privacy system generates the parameters by modifying/updating initialized or previously determined parameters. Thus, the user-entity differential privacy system injects noise into the parameters of the natural language model.

In some implementations, the user-entity differential privacy system implements an iterative process for generating the natural language model. In particular, the user-entity differential privacy system iteratively determines a set of sensitive data points, determines an average gradient using the sensitive data points, determines a noise scale, and generates (e.g., updates) parameters for the natural language model. Thus, the user-entity differential privacy system iteratively refines the natural language model using noisy parameters.

In one or more embodiments, the user-entity differential privacy system further utilizes the natural language model having the noisy parameters to perform a natural language task. For instance, the user-entity differential privacy system utilizes the natural language model to perform next word prediction, part-of-speech tagging, text, classification, etc. By implementing the natural language model with the noisy parameters, the user-entity differential privacy system protects the users and sensitive entities associated with the natural language dataset used to generate the natural language model from discovery (e.g., via analysis of the model parameters).

As mentioned, conventional differential privacy systems suffer from various shortcomings that result in inflexible, insecure, and/or inaccurate operation. For example, conventional systems are typically limited to protecting a particular type of data associated with a dataset that is used to generate (e.g., train) a model, leaving some sensitive data at risk of exposure. For example, some conventional systems provide sample-level protection (e.g., protection against discovery of data points included in the data set) but fail to provide thorough protection in scenarios where a user contributes multiple samples. Thus, such systems often allow for potential discovery of user participation within the dataset. Other conventional systems target the protection of user participation information but fail to provide protection for the textual information (e.g., sensitive entities) included in the dataset. Some conventional systems provide protection for individual elements (e.g., a word or type of word included in the dataset) but can fail when a data sample includes multiple instances of the same element and further fails to provide protection on the user level. Accordingly, the inflexibility of such conventional systems constitutes a security risk with regards to the discovery of sensitive data.

Further, conventional differential privacy systems often fail to generate a model that accurately performs tasks while providing sufficient protection for the data used to train the model. Indeed, in many instances, a trade-off exists between model utility and data security. Generating a model with higher utility (e.g., higher performance accuracy) often leaves the underlying data used to generate the model more unsecure and vice versa. Conventional systems often fail to properly balance these interests, however, providing sub-optimal security, sub-optimal model utility, or both. In other words, these conventional systems may generate models that perform inaccurately and/or provide weak protection for sensitive information included in the underlying data.

The user-entity differential privacy system provides several advantages over conventional systems. For instance, the user-entity differential privacy system operates more flexibly than conventional systems. Indeed, the user-entity differential privacy system protects information related to users and sensitive entities simultaneously, providing more flexible protection compared to conventional systems that offer security only for a single type of data. The user-entity differential privacy system offers further flexibility by facilitating configuration of the protection provided. In particular, the user-entity differential privacy system facilitates configuration of the level of protection for users and sensitive entities as well as configuration of the sensitive entities that are to be protected.

Further, the user-entity differential privacy system improves the balance of data security and model utility. Indeed, the user-entity differential privacy system generates natural language models that accurately perform natural language tasks while also offering strong protection against the leaking of sensitive data.

Additional detail regarding the user-entity differential privacy system will now be provided with reference to the figures. For example, FIG. 1 illustrates a schematic diagram of an exemplary system 100 in which a user-entity differential privacy system 106 operates. As illustrated in FIG. 1, the system 100 includes a server(s) 102, a network 108, client devices 110a-110n, and a natural language database 114.

Although the system 100 of FIG. 1 is depicted as having a particular number of components, the system 100 can have any number of additional or alternative components (e.g., any number of servers, client devices, natural language databases, or other components in communication with the user-entity differential privacy system 106 via the network 108). Similarly, although FIG. 1 illustrates a particular arrangement of the server(s) 102, the network 108, the client devices 110a-110n, and the natural language database 114, various additional arrangements are possible.

The server(s) 102, the network 108, the client devices 110a-110n, and the natural language database 114 may be communicatively coupled with each other either directly or indirectly (e.g., through the network 108 discussed in greater detail below in relation to FIG. 10). Moreover, the server(s) 102, and the client devices 110a-110n may include a variety of computing devices (including one or more computing devices as discussed in greater detail with relation to FIG. 10).

As mentioned above, the system 100 includes the server(s) 102. In one or more embodiments, the server(s) 102 generates, stores, receives, and/or transmits data, including data associated with sensitive information. For instance, in some embodiments, the server(s) 102 receives data, such as one or more natural language texts, from a client device (e.g., one of the client devices 110a-110n). In some cases, the server(s) 102 combines the received natural language texts with natural language texts received from other client devices to generate a natural language dataset for use in generating natural language models. In one or more embodiments, the server(s) 102 comprises a data server. In some implementations, the server(s) 102 comprises a communication server or a web-hosting server.

As shown in FIG. 1, the server(s) 102 can include a machine learning system 104. In particular, in one or more embodiments, the machine learning system 104 initializes, generates (e.g., trains), and/or implements machine learning models, such as natural language models. For example, in some instances, the machine learning system 104 accesses a natural language dataset and generates a natural language model using the natural language dataset. In some implementations, the machine learning system 104 further utilizes the natural language model to perform a natural language task.

Additionally, the server(s) 102 includes the user-entity differential privacy system 106. In particular, in one or more embodiments, the user-entity differential privacy system 106 utilizes the server(s) 102 to generate a natural language model that provides user-entity differential privacy. For example, in some implementations, the user-entity differential privacy system 106 utilizes the server(s) 102 to access a natural language dataset and generate a natural language model that protects the users and sensitive entities represented by the natural language dataset.

To illustrate, in one or more embodiments, the user-entity differential privacy system 106, via the server(s) 102, determines, from a natural language dataset, a set of sensitive data points that are associated with one or more users and include at least one sensitive entity. Further, via the server(s) 102, the user-entity differential privacy system 106 utilizes the set of sensitive data points to generate a natural language model that provides user-entity differential privacy for the one or more users and the at least one sensitive entity. For instance, via the server(s) 102, the user-entity differential privacy system 106 determines an average gradient corresponding to the set of sensitive data points using a user-entity estimator. Via the server(s) 102, the user-entity differential privacy system 106 further determines a noise scale for the user-entity estimator. Using the average gradient and the noise scale, the user-entity differential privacy system 106, via the server(s) 102 generates parameters for the natural language model.

In one or more embodiments, the natural language database 114 stores one or more natural language datasets. For example, in some cases, the natural language database 114 stores natural language datasets useful for training natural language models to perform various tasks. Though FIG. 1 illustrates the natural language database 114 as a distinct component, one or more embodiments include the natural language database 114 as a component of the server(s) 102, the machine learning system 104, or the user-entity differential privacy system 106.

In one or more embodiments, the client devices 110a-110n include computing devices that can generate and/or transmit natural language texts. For example, the client devices 110a-110n can include smartphones, tablets, desktop computers, laptop computers, head-mounted-display devices, and/or other electronic devices. In some instances, the client devices 110a-110n include one or more applications (e.g., the client application 112) that can generate and/or transmit natural language texts. For example, in one or more embodiments, the client application 112 includes a software application installed on the client devices 110a-110n. Additionally, or alternatively, the client application 112 includes a software application hosted on the server(s) 102 (and supported by the machine learning system 104), which may be accessed by the client devices 110a-110n through another application, such as a web browser.

In particular, in some implementations, the user-entity differential privacy system 106 on the server(s) 102 supports the user-entity differential privacy system 106 on the client device 110n. For instance, the user-entity differential privacy system 106 on the server(s) 102 learns parameters for the natural language model 104. The user-entity differential privacy system 106 then, via the server(s) 102, provides the natural language model 104 to the client device 110n. In other words, the client device 110n obtains (e.g., downloads) the natural language model 104 with the learned parameters from the server(s) 102. Once downloaded, the client device 110n can utilize the natural language model 104 to perform one or more natural language tasks independent from the server(s) 102.

In alternative implementations, the user-entity differential privacy system 106 includes a web hosting application that allows the client device 110n to interact with content and services hosted on the server(s) 102. To illustrate, in one or more implementations, the client device 110n accesses a web page supported by the server(s) 102. The client device 110n provides input to the server(s) 102 to perform a natural language task utilizing the machine learning system 104, and, in response, the user-entity differential privacy system 106 on the server(s) 102 performs the task. The server(s) 102 then provides the output or results of the natural language task to the client device 110n.

The user-entity differential privacy system 106 can be implemented in whole, or in part, by the individual elements of the system 100. Indeed, although FIG. 1 illustrates the user-entity differential privacy system 106 implemented with regard to the server(s) 102, different components of the user-entity differential privacy system 106 can be implemented by a variety of devices within the system 100. For example, one or more (or all) components of the user-entity differential privacy system 106 can be implemented by a different computing device (e.g., one of the client devices 110a-110n) or a separate server from the server(s) 102 hosting the machine learning system 104. Example components of the user-entity differential privacy system 106 will be described below with regard to FIG. 8.

Figure 2:
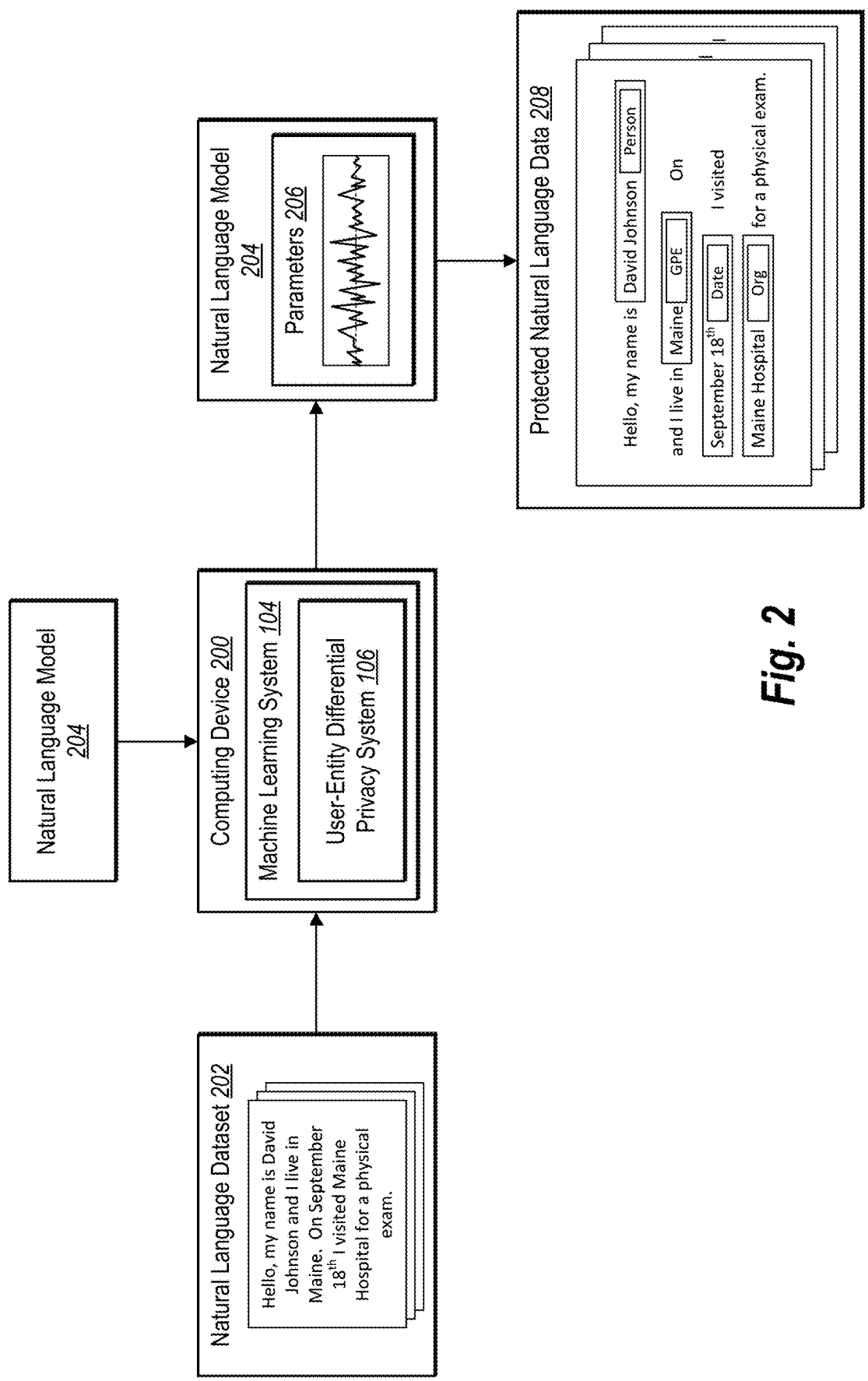
FIG. 2 illustrates an overview diagram of the user-entity differential privacy system generating a natural language model that provides user-entity differential privacy in accordance with one or more embodiments.

As mentioned above, in one or more embodiments, the user-entity differential privacy system 106 generates (e.g., trains) a natural language model that provides user-entity differential privacy with regards to users and sensitive entities represented in a natural language dataset. FIG. 2 illustrates an overview diagram of the user-entity differential privacy system 106 generating a natural language model that provides user-entity differential privacy in accordance with one or more embodiments.

As shown in FIG. 2, the user-entity differential privacy system 106 accesses a natural language dataset 202. In one or more embodiments, a natural language dataset includes a collection of data. In particular, in some embodiments, a natural language dataset includes a set of natural language texts. For instance, in some cases, a natural language dataset includes various samples of natural language text from one or more sources (e.g., contributed by one or more users and/or retrieved from one or more data stores).

In one or more embodiments, a natural language text includes text that is formed from or includes language associated with humans. In particular, in some embodiments, a natural language text includes a text having language typically associated with communication between humans. For instance, in some implementations, a natural language text includes a text having language that would typically be understandable to a human being. In some cases, a natural language text includes, but is not limited to, a single word or phrase, a sentence, or a group of sentences (e.g., a paragraph of text).

As previously indicated, in some cases, a natural language dataset is associated with one or more users. In one or more embodiments, a user comprises a data owner. In particular, in some embodiments, a user includes an individual or other entity (e.g., group, organization, etc.) that contributed at least one natural language text to the natural language dataset either directly or indirectly. In some cases, the natural language text contributed by a user relates to the user (e.g., references the user and/or includes information associated with the user). In some instances, the natural language text contributed by a user relates to some other entity (e.g., references the other entity and/or includes information associated with the other entity).

As further mentioned, in some embodiments, a natural language dataset includes one or more sensitive entities. In particular, in some cases, the natural language texts of the natural language dataset reference one or more sensitive entities. In one or more embodiments, a sensitive entity includes a piece of information that is referenced within a natural language text and is targeted for protection against discovery. In particular, in some embodiments, a sensitive entity includes a word or other value or a series of consecutive words or other values to be protected. For instance, in some implementations, a sensitive entity includes, but is not limited to, personal identification information (e.g., name, birth date, address, social security number, etc.), a location, an organization, or a medical symptom or diagnosis.

In some embodiments, the user-entity differential privacy system 106 accesses the natural language dataset 202 by accessing a database that stores one or more natural language datasets. For example, in at least one implementation, the user-entity differential privacy system 106 maintains a natural language database and stores natural language texts therein. The user-entity differential privacy system 106 further organizes the stored natural language texts within one or more natural language datasets. In some instances, an external device or system stores natural language datasets for access by the user-entity differential privacy system 106.

As discussed above, and as shown in FIG. 2, in some instances, the user-entity differential privacy system 106 operates on a computing device 200 (e.g., the server(s) 102 discussed above with reference to FIG. 1 or some other computing device). Accordingly, in some embodiments, the user-entity differential privacy system 106 accesses the natural language dataset 202 from local storage.

As shown in FIG. 2, the user-entity differential privacy system 106 further receives, retrieves, or otherwise accesses a natural language model 204. In one or more embodiments, a computer-implemented algorithm or model that performs a natural language task. For instance, in one or more embodiments, a natural language model includes a computer-implemented model that analyzes one or more natural language texts and generates an outcome (e.g., a prediction) based on the analysis. For instance, in some cases, a natural language model includes a computer-implemented model that performs, based on an analysis of one or more natural language texts, next word prediction, part-of-speech tagging, text, classification, etc. In some cases, a natural language model includes a machine learning model, such as a neural network.

Generally, in one or more embodiments, a machine learning model is tunable based on inputs to approximate unknown functions used for generating the corresponding outputs. Indeed, in some embodiments, a neural network (an example of a machine learning model) includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms)

that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

Additionally, as shown in FIG. 2, the user-entity differential privacy system 106 utilizes the natural language dataset 202 to generate parameters 206 for the natural language model 204. In one or more embodiments, a parameter includes a variable that is internal to a model, such as a natural language model. In particular, in some embodiments, a parameter includes a variable that affects the operation of the corresponding model. For instance, in some cases, a parameter includes a variable of a function performed by a model that affects the outcome or some other internal value generated by the model.

In one or more embodiments, the user-entity differential privacy system 106 generates the parameters 206 for the natural language model 204 by determining a set of sensitive data points from the natural language dataset 202. The user-entity differential privacy system 106 utilizes the set of sensitive data points to generate noise. The user-entity differential privacy system 106 further utilizes the noise in generating the parameters 206. In some instances, the user-entity differential privacy system 106 iteratively determines sensitive data points, generates noises, and updates the parameters 206 based on the noise. Generating the parameters 206 for the natural language model 204 will be discussed in more detail below with reference to FIG. 4.

As illustrated in FIG. 2, by using the natural language model 204 with the parameters 206, the user-entity differential privacy system 106 protects natural language data (as shown by the box 208). In particular, the user-entity differential privacy system 106 protects the users and the sensitive entities associated with the natural language dataset 202. To illustrate, by generating the parameters 206 using noise, the user-entity differential privacy system 106 prevents discovery of the participation of the users and inclusion of the sensitive entities by inferences made via an analysis of the parameters 206. Indeed, although FIG. 2 explicitly illustrates protection of sensitive entities referenced in natural language texts, the user-entity differential privacy system 106 also prevents discovery of information of the users associated with those natural language texts. In particular, by generating the parameters 206 for the natural language model 204, the user-entity differential privacy system 106 generates a natural language model that provides user-entity differential privacy with respect to users and sensitive entities associated with the natural language dataset 202.

Generally speaking, in one or more embodiments, the user-entity differential privacy system 106 determines differential privacy to include a form of protection that restricts adversaries (e.g., malicious actors) in what they can learn from data used to generate (e.g., train) a model given the parameters of that model. For instance, in some cases, the user-entity differential privacy system 106 determines differential privacy to ensure similar model outcomes whether the dataset used to generate the model includes a particular data-such as a particular element, a particular data sample, or data samples contributed by a particular user. Indeed, in some cases, differential privacy centers around adjacent databases, which include a pair of databases (e.g., datasets) that differ in particular data, such as one of those named above. Thus, in some implementations, the user-entity differential privacy system 106 determines that differential privacy (E, δ)-DP is fulfilled based on the following:

$$\Pr[\mathcal{A}(D)=\mathcal{O}] \leq e^{\epsilon}\Pr[(\mathcal{A}(D')=\mathcal{O}]+\delta \quad (1)$$

In equation 1, $\mathcal{A}$ represents a randomized algorithm, D and D' represent a pair of adjacent databases, and $\mathcal{O} \subseteq \text{Range}(\mathcal{A})$ represents an outcome of the randomized algorithm. Additionally, δ represents a broken probability, indicating the event that an adversary will be able to infer that certain data (which belongs to the dataset used to generate a model) will happen with probability ≤δ. Further, E represents a privacy budget that controls the amount by which the distributions induced by D and D' are able to differ. In some cases, the user-entity differential privacy system 106 utilizes a smaller ϵ to provide a stronger privacy guarantee. Accordingly, equation 1 provides a general differential privacy rule. As discussed above, under conventional systems, differential privacy was limited in the data that could be protected.

In one or more embodiments, the user-entity differential privacy system 106 determines user-entity differential privacy to include a form of protection that simultaneously prevents adversaries from learning about both the users that contributed to data used to generate a model given the parameters of that model as well as the sensitive entities included in (e.g., referenced by) the data. For instance, in some cases, the user-entity differential privacy system 106 determines user-entity differential privacy to ensure similar model outcomes whether the dataset used to generate the model includes reference to a particular sensitive entity and data samples from a particular user. Indeed, in some cases, user-entity differential privacy centers around user-entity adjacent databases, which include a pair of databases (e.g., datasets) that differ in a single user and a single sensitive entity. To illustrate, in some implementations, the user-entity differential privacy system 106 determines that two databases are user-entity adjacent if one user and one sensitive entity are present in one database and are absent in the other. That is, the user-entity differential privacy system 106 determines that two databases D and D' are user-entity adjacent if $\|U-U'\|_1 \leq 1$ and $\|E-E'\|_1 \leq 1$ where U and E are the sets of users and sensitive entities in D, and U' and E' are the sets of users and sensitive entities in D'. Thus, in some implementations, the user-entity differential privacy system 106 determines that user-entity differential privacy (ϵ,δ)-UeDP is fulfilled based on the following:

$$\Pr[A(D)=0] \leq e^{\epsilon}\Pr[A(D')=O]+\delta \quad (2)$$

It should be noted that equation 2 differs from equation 1 in that D and D' in equation 2 represent a pair of user-adjacent databases. Accordingly, in some instances, equation 2 provides a user-entity differential privacy rule. By generating a natural language model that provides differential privacy with respect to the users and sensitive entities associated with a dataset, the user-entity differential privacy system 106 offers improved flexibility and security when compared to conventional systems. Indeed, the user-entity differential privacy system 106 flexibly protects multiple types of data (e.g., user participation information and sensitive entities) simultaneously rather than providing limited protection to a single type of data. Thus, the user-entity differential privacy system 106 offers more robust security of the data used to generate a natural language model.

Figure 3:
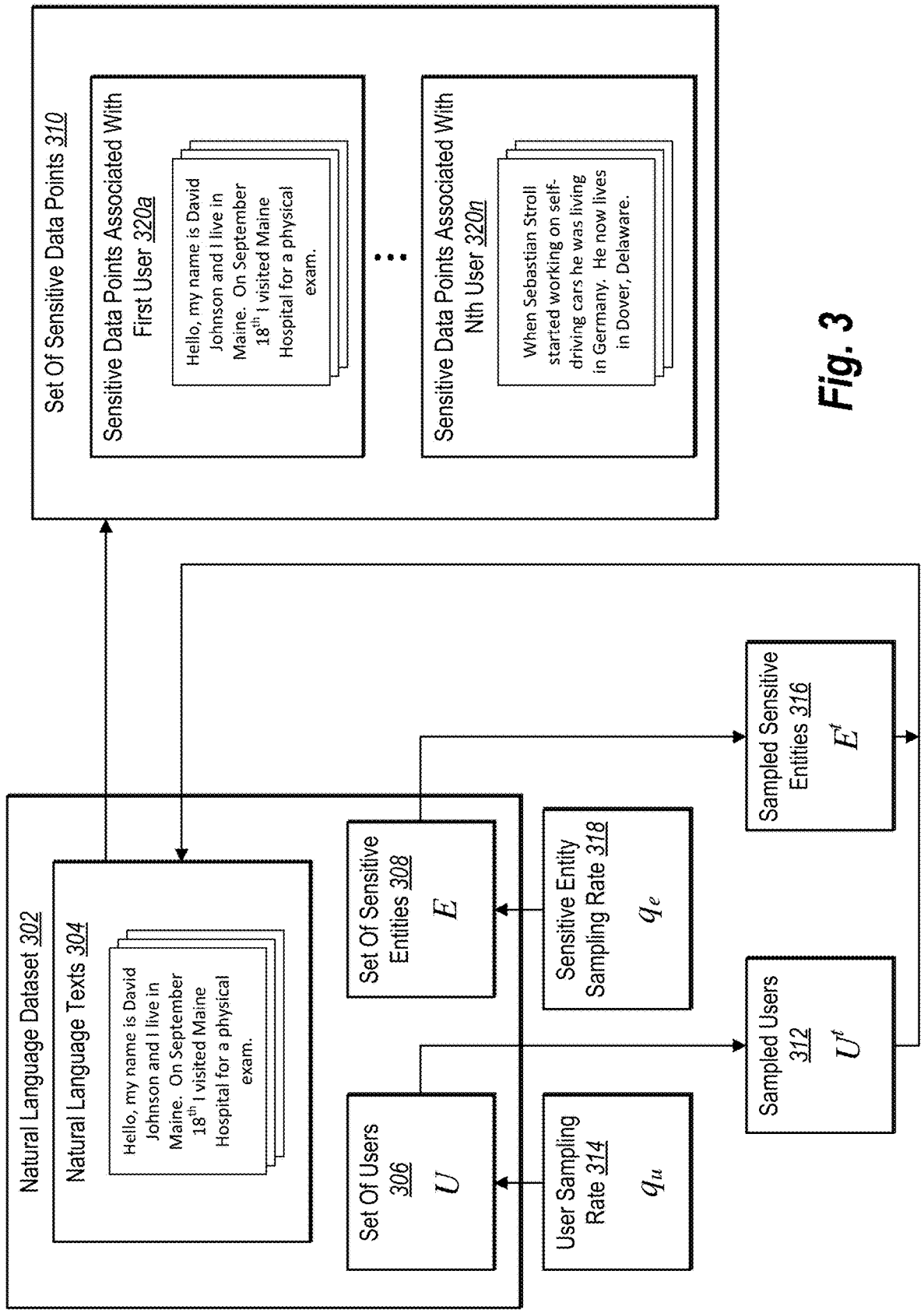
FIG. 3 illustrates a block diagram for determining a set of sensitive data points from a natural language dataset in accordance with one or more embodiments.

As mentioned above, in one or more embodiments, the user-entity differential privacy system 106 determines a set of sensitive data points for use in generating a natural language model that provides user-entity differential privacy. FIG. 3 illustrates a block diagram for determining a set of sensitive data points in accordance with one or more embodiments.

In one or more embodiments, a sensitive data point includes a natural language text associated with information that is targeted for protection. In particular, in some embodiments, a sensitive data point includes a natural language text (or a portion of a natural language text) that is associated with (e.g., contributed by) a user. In some cases, a sensitive data point includes a natural language text that references a sensitive entity. The disclosure refers to natural language texts and sensitive data points interchangeably.

As illustrated by FIG. 3, the user-entity differential privacy system 106 determines a set of sensitive data points 310 from a natural language dataset 302. As shown, the natural language dataset 302 includes a plurality of natural language texts 304. As further shown, the natural language texts 304 are associated with a set of users 306 and a set of sensitive entities 308. In other words, the natural language texts 304 are contributed by the set of users 306 and include (e.g., reference) the set of sensitive entities 308.

Indeed, in one or more embodiments, each natural language text of the natural language dataset 302 is a sensitive data point. In particular, each natural language text is associated with at least one user whose participation is targeted for protection against discovery. Further, each natural language text may include reference to one or more sensitive entities that are to be protected. Accordingly, in one or more embodiments, the user-entity differential privacy system 106 determines the set of sensitive data points 310 by sampling natural language texts from the natural language texts 304 of the natural language dataset 302.

To illustrate, as shown in FIG. 3, the user-entity differential privacy system 106 determines sampled users 312 to represent within the set of sensitive data points 310 by sampling from the set of users 306 using a user sampling rate 314. In one or more embodiments, a user sampling rate includes a rate at which users are selected from a set of users. For instance, in some implementations, a user sampling rate indicates a rate or frequency with which users are selected while traversing a set containing the users. In some implementations, a user sampling rate corresponds to a probability with which a particular user is selected.

Additionally, as shown, the user-entity differential privacy system 106 determines sampled sensitive entities 316 to represent within the set of sensitive data points 310 by sampling from the set of sensitive entities 308 using a sensitive entity sampling rate 318. In one or more embodiments, a sensitive entity sampling rate includes a rate at which sensitive entities are selected from a set of sensitive entities. For instance, in some implementations, a sensitive entity sampling rate indicates a rate or frequency with which sensitive entities are selected while traversing a set containing the sensitive entities. In some implementations, a sensitive entity sampling rate corresponds to a probability with which a particular sensitive entity is selected.

As further illustrated by FIG. 3, the user-entity differential privacy system 106 determines the set of sensitive data points 310 by selecting, from the natural language dataset 302, sensitive data points (e.g., natural language texts) that are associated with the sampled users 312 from the set of users 306 and include at least one of the sampled sensitive entities 316 from the set of sensitive entities 308. Indeed, as shown in FIG. 3, the set of sensitive data points 310 include sensitive data points $320a$-$320n$ (e.g., natural language texts) associated with the sampled users 312. In some embodiments, the number of the sampled sensitive entities 316 referenced by each sensitive data point in the set of sensitive data points 310 varies.

Figure 4:
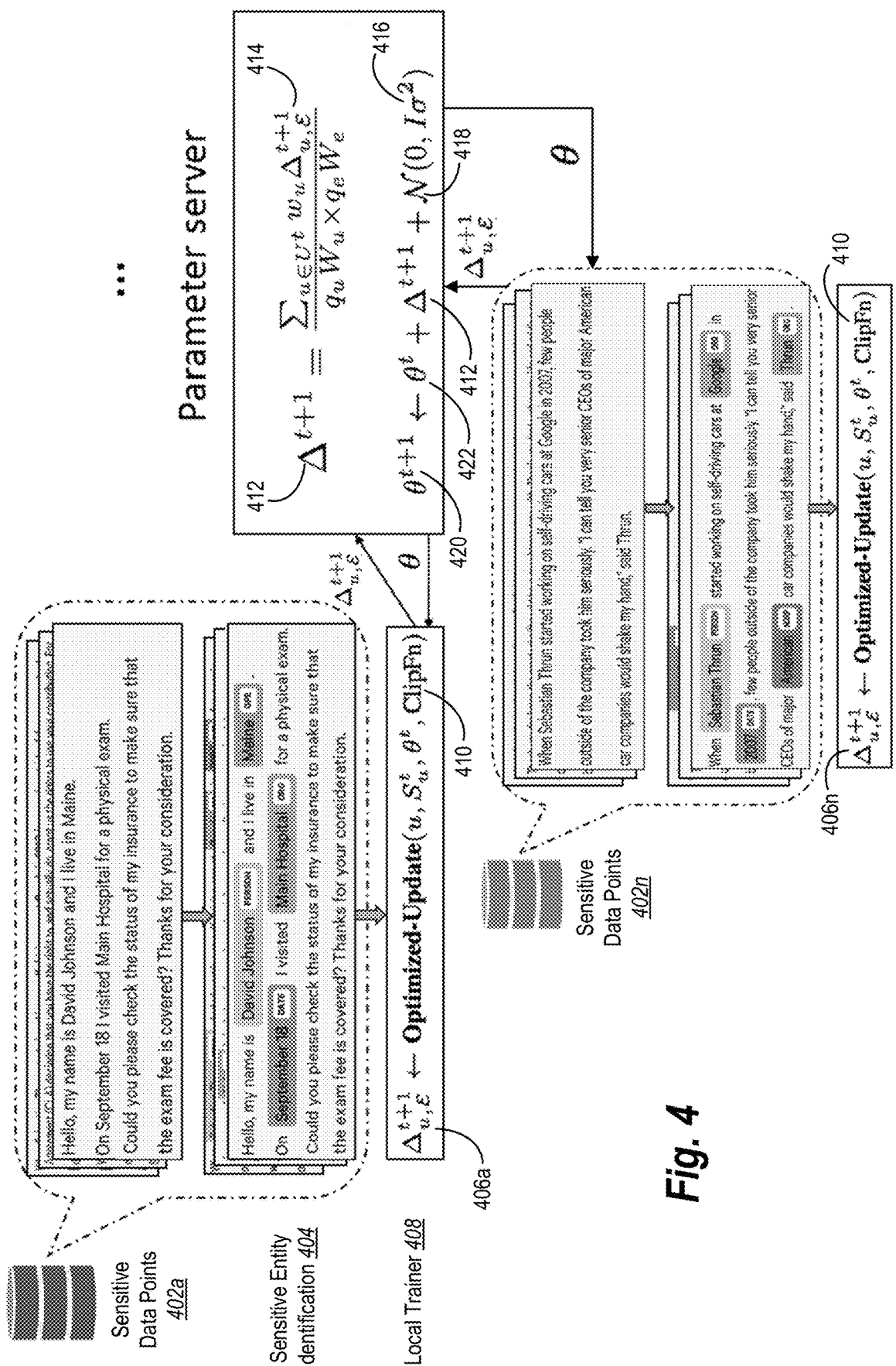
FIG. 4 illustrates a diagram for generating a natural language model that provides differential privacy in accordance with one or more embodiments.

As previously mentioned, in one or more embodiments, the user-entity differential privacy system 106 utilizes the set of sensitive data points determined from a natural language dataset to generate a natural language model that provides user-entity differential privacy. FIG. 4 illustrates a diagram for generating a natural language model that provides differential privacy in accordance with one or more embodiments.

As shown in FIG. 4, the user-entity differential privacy system 106 determines the sensitive data points $402a$-$402n$. In particular, in one or more embodiments, the user-entity differential privacy system 106 determines the sensitive data points $402a$-$402n$ from a natural language dataset as discussed above with reference to FIG. 3. In one or more embodiments, the sensitive data points $402a$ are associated with a first user, and the sensitive data points $402n$ are associated with a $n^{th}$ user.

As further shown in FIG. 4, the user-entity differential privacy system 106 performs an act 404 of identifying sensitive entities within each of the sensitive data points $402a$-$402n$. For example, in some implementations, the user-entity differential privacy system 106 identifies those sensitive entities (e.g., the sampled sensitive entities 316) from the set of all sensitive entities represented within the natural language dataset. In some cases, the user-entity differential privacy system 106 identifies all sensitive entities included in the sensitive data points $402a$-$402n$. In some implementations, the user-entity differential privacy system 106 identifies the sensitive entities while extracting and selecting the sensitive data points $402a$-$402n$. In other words, in some cases, the user-entity differential privacy system 106 determines that a natural language text includes one or more sensitive entities before selecting the natural language text for use in generating a natural language model as discussed above with reference to FIG. 3.

In some cases, the natural language texts of the natural language dataset include sensitive entity indicators to facilitate their identification. In some instances, the natural language dataset includes a named entity recognition (NAR) dataset in which entities in the natural language texts are labeled based on one or more pre-defined categories, such as location, person, organization, and miscellaneous. In some instances, the user-entity differential privacy system 106 utilizes an entity recognition model, such as the model described in Honnibal, M. and Montani, I., *Spacy 2: Natural Language Understanding with Bloom Endings, Convolutional Neural Networks, and Incremental Parsing*, To Appear, 7 (1), 2017 or the model described in Qi, P. et al., *Stanza: A Python Natural Language Processing Toolkit for Many Human Languages*, arXiv preprint arXiv: 2003.07082, 2020, both of which are incorporated herein by reference in their entirety.

Additionally, as shown in FIG. 4, the user-entity differential privacy system 106 determines, for each user associated with the sensitive data points $402a$-$402n$, one or more gradients corresponding to the parameters of the natural language model using the sensitive data points corresponding to that user. In one or more embodiments, a gradient includes a value used to update or modify a model. In particular, in some embodiments, a gradient includes a value used to modify the parameters of a model, such as a natural language model. In some implementations, a gradient includes a value associated with an error of a model. For instance, a gradient corresponds to a magnitude and direction for modifying a model (e.g., the parameters of the model) based on an error previously made by the model. In one or more embodiments, the user-entity differential privacy system 106 denotes a gradient corresponding to user u as $\Delta_{u,\varepsilon}^{t+1}$.

Indeed, as illustrated in FIG. 4, the user-entity differential privacy system 106 determines the one or more gradients 406a for the user corresponding to the sensitive data points 402a. Further, the user-entity differential privacy system 106 determines the one or more gradients 406n for the user corresponding to the sensitive data points 402n. In one or more embodiments, the user-entity differential privacy system 106 determines the one or more gradients as follows:

$$\Delta_{u,\varepsilon}^{t+1} = \sum_{e \in E^t} w_e \left( \sum_{s \in S_{ue}^t} \Delta_{u,s} \right) \quad (3)$$

In equation 3, e represents a sensitive entity from the sampled sensitive entities $E^t$ and s represents a sensitive data point from the set of sensitive data points $S_{ue}^t$ that are associated with the user u and include the sensitive entity e. Additionally, $w_e \in [0,1]$ represents one or more weights associated with the sensitive entity e. Further, $\Delta_{u,s}$ represents a gradient value. In one or more embodiments, a gradient value includes a value used to determine a gradient. In particular, in some embodiments, a gradient value includes a value that is associated with an error of a model and further used to determine gradients corresponding to the parameters of that model. For instance, in some embodiments, the user-entity differential privacy system 106 determines a gradient value as $\Delta_{u,s} = \theta - \theta^t$ where $\theta \leftarrow \theta^t - \eta \nabla l(\theta, s)$ represents model parameters as will be discussed in more detail with reference to algorithm presented below. In other words, in one or more embodiments, a gradient value $\Delta_{u,s}$ includes a parameter gradient determined using the sensitive data point s.

As shown in FIG. 4, the user-entity differential privacy system 106 determines the one or more gradients for each user associated with the sensitive data points 402a-402n during training of the natural language model (as indicated by implementation of the local trainer 408). For instance, in one or more embodiments, the user-entity differential privacy system 106 utilizes the natural language model to generate model predictions based on the sensitive data points 402a-402n (e.g., via several iterations with each iteration generating a new model prediction or new set of model predictions using one or more sensitive data points from the sensitive data points 402a-402n). In one or more embodiments, a model prediction includes an output generated by a model, such as the natural language model. In particular, in some embodiments, a model prediction includes an output generated by a model based on an analysis of an input to the model. For instance, in some cases, a natural language model generates a model prediction by performing a natural language task (e.g., next word prediction) based on an input.

Accordingly, the user-entity differential privacy system 106 determines the one or more gradients for each user based on the model predictions. To illustrate, in one or more embodiments, the user-entity differential privacy system 106 determines errors of the natural language model based on the model predictions (e.g., by comparing the model predictions to ground truths via a loss function). Further, the user-entity differential privacy system 106 determines the one or more gradients using the determined errors.

In one or more embodiments, the user-entity differential privacy system 106 determines the one or more gradients for each user by determining one or more bounded gradients. In one or more embodiments, a bounded gradient includes a gradient having a value that is bounded by at least one value limit. For instance, in some cases, a bounded gradient includes a gradient having a value that falls within a range of limiting values. In some cases, the user-entity differential privacy system 106 utilizes $\Delta_{u,\varepsilon}^{t+1}$ denote gradients and bounded gradients interchangeably.

In some implementations, the user-entity differential privacy system 106 determines the bounded gradients by clipping the one or more gradients determined for each user. For instance, as shown in FIG. 4, the user-entity differential privacy system 106 utilizes a clipping model 410. In one or more embodiments, a clipping model includes a computer implemented model that clips (e.g., bounds) a value to satisfy a value limit. In particular, in some embodiments, a clipping model utilizes a value that exceeds a value limit to generate a new value within that value limit. For instance, in some implementations, a clipping model clips the one or more gradients determines for a user so that its l2-norm is bounded by a pre-defined gradient clipping bound $\beta$.

In one or more embodiments, the user-entity differential privacy system 106 utilizes federated learning to determine the one or more gradients for each user. For instance, in some implementations, the user-entity differential privacy system 106 determines the one or more gradients utilizing federated learning as described in Manoj Ghuhan Arivazhagan et al., *Federated Learning with Personalization Layers*, arXiv: 1912.00818, 2019, which is incorporated herein by reference in its entirety. In some cases, the user-entity differential privacy system 106 determines the one or more gradients using federated learning as described in McMahan, H. et al., *Learning Differentially Private Recurrent Language Models*, arXiv preprint arXiv: 1710.06963, 2017, which is incorporated herein by reference in its entirety.

As further shown in FIG. 4, the user-entity differential privacy system 106 determines an average gradient 412 based on the one or more gradients determined for each user associated with the sensitive data samples 402a-402n. In one or more embodiments, an average gradient includes a value determined from a combination of gradients. For example, in some implementations, an average gradient includes an average of a set of gradients. In one or more embodiments, the user-entity differential privacy system 106 denotes an average gradient as $\Delta^{t+1}$.

As illustrated, the user-entity differential privacy system 106 determines the average gradient 412 using a user-entity estimator 414 (denoted as $f_\varepsilon$). In one or more embodiments, a user-entity estimator includes a model for determining an average gradient. In particular, in some embodiments, a user-entity estimator includes a model for determining a weighted-average based on a plurality of gradients. For instance, in some cases, a user-entity estimator determines an average gradient based on utilizing a user sampling rate, a sensitive entity sampling rate, a first set of weights corresponding to the one or more users, and a second set of weights corresponding to the at least one sensitive entity. Indeed, in one or more embodiments, the user-entity differential privacy system 106 utilizes the user-entity estimator 414 to determine the average gradient 412 as follows:

$$f_{\varepsilon}(U^t, E^t) = \frac{\sum_{u \in U^t} w_u \Delta_{u,\varepsilon}^{t+1}}{q_u W_u \times q_e W_e} \quad (4)$$

In equation 4, $q_u$ represents the user sampling rate and $q_e$ represents the sensitive entity sampling rate used in determining the sensitive data points 402a-402n. Additionally, $w_u \in [0,1]$ represents the weight associated with user u. In one or more embodiments, $w_u$ and $w_e$ capture the influence and a sensitive entity on the output of the natural language model. Further, in equation 4, $\Sigma_u = \Sigma_u w_u$ represents the set of weights for the users associated with the sensitive data points 402a-402n. Similarly, $W_e = \Sigma_e w_e$ represents the set of weights for the sensitive entities represented in the sensitive data points 402a-402n.

In one or more embodiments, the user-entity estimator 414 is unbiased to the sampling process since $\mathbb{E}[\Sigma_{u \in U^t} w_u] q_u W_u$ and $\mathbb{E}[\Sigma_{e \in E^t} w_e] = q_e W_e$. In some cases, the user-entity differential privacy system 106 determines the sensitivity of the user-entity estimator 414 as $\mathbb{S}(f_\varepsilon) = \max_{u',e'} \|f_\varepsilon(\{U^t \cup u', E^t \cup e'\}) - f_\varepsilon(\{U^t, E^t\})\|_2$, where the added user u' can have arbitrary data and e' is an arbitrary sensitive entity. In one or more embodiments, given that the one or more gradients $\Delta_{u,\varepsilon}^{t+1}$ determined for each user associated with the sensitive data points 402a-402n are l2($\beta$)-norm bounded and $\beta$ is the radius of the norm ball, by replacing $\Delta_{u,\varepsilon}^{t+1}$ with $$\Delta_{u,\varepsilon}^{t+1} \cdot \min\left(1, \frac{\beta}{\|\Delta\|}\right),$$

the user-entity differential privacy system 106 determines a sensitivity bound $\mathbb{S}$ for the user-entity estimator 414 based on the following—if for all users u, $\|\Delta_{u,\varepsilon}^{t+1}\|_2 \leq \beta$, then:

$$\mathbb{S}(f_\varepsilon) \leq \frac{(|U|+1)\max(w_u)\beta}{q_u W_u \times q_e W_e} \quad (5)$$

As further shown in FIG. 4, the user-entity differential privacy system 106 determines a noise scale 416 (denoted as $\sigma$) for the user-entity estimator 414. In one or more embodiments, a noise scale includes a level of noise. In particular, in some embodiments, a noise scale includes a level of noise determined for a user-entity estimator. For instance, in some implementations, a noise scale includes a level of noise that is based on a sensitivity bound of a user-estimator. Indeed, in one or more embodiments, the user-entity differential privacy system 106 determines the noise scale 416 for the user-entity estimator 414 based on the sensitivity bound for the user-entity estimator 414 and using a hyperparameter z as follows:

$$\sigma = z \mathbb{S}(f_\varepsilon) = \frac{z(|U|+1)\max(w_u)\beta}{q_u W_u \times q_e W_e} \quad (6)$$

Additionally, as shown in FIG. 4, the user-entity differential privacy system 106 utilizes the noise scale 416 to determine the Gaussian noise 418 defined as $\mathcal{N}(0, I\sigma^2)$. Further, the user-entity differential privacy system 106 utilizes the gaussian noise 418 and the average gradient 412 to generate the parameters 420 for the natural language model. In some cases, as illustrated, the user-entity differential privacy system 106 generates the parameters 420 by updating/modifying parameters 422 that were previously initialized or previously updated/modified for the natural language model.

Indeed, in one or more embodiments, the user-entity differential privacy system 106 generates the natural language model via an iterative process. In particular, in some embodiments, the user-entity differential privacy system 106 iteratively selects sensitive data points from the natural language dataset (e.g., using the user sampling rate and the sensitive entity sampling rate), determines a noise scale and an average gradient for the sensitive data points, and generates/modifies the parameters of the natural language model accordingly. Thus, the user-entity differential privacy system 106 generates a natural language model that can accurately perform a natural language task. By adding noise to the parameters as described above, the user-entity differential privacy system 106 further facilitates implementation of user-entity differential privacy via the natural language model.

The algorithm presented below is another characterization of how the user-entity differential privacy system 106 generates a natural language model that provides user-entity differential privacy.

| Algorithm |
| --- |
| 1: Input: Dataset D, set of sensitive entities E, set of sensitive samples (e.g., sensitive data points) S, set of non-sensitive samples $\bar{S}$, user sampling rate $q_u$, sensitive entity sampling rate $q_e$, a hyper parameter z, gradient clipping bound $\beta$, and number of iterations T |
| 2: Initialize model $\theta^o$ and moments accountant $\mathcal{M}$ |
| 3: $w_u = \min\left(\frac{n_u}{\hat{w}_u}, 1\right)$ for all users u ($n_u$ is the number of samples in user u, $w_u$ is per–user sample cap) |
| 4: $w_e = \min\left(\frac{n_e}{\hat{w}_e}, 1\right)$ for all sensitive samples in S ($n_e$ is the number of sensitive samples containing sensitive entities e, $\hat{w}_e$ is per-entity sample cap) |
| 5: $W_u = \Sigma_u w_u$, $W_e = \Sigma_{e \in S} w_e$ |
| 6: for $t \in T$ do |
| 7:    $U^t \leftarrow$ sample users with probability $q_u$ |
| 8:    for each user $u \in U^t$ do |
| 9:       $S_u^t \leftarrow$ sensitive samples (belonging to the user u) consisting of sensitive entities $E^t$ sampled from E with probability $q_e$ |
| 10:      $\Delta_{u,\varepsilon}^{t+1} \leftarrow$ UeDP-Update(u, $S_u^t$, $\theta^t$, ClipFn) |

-continued

Algorithm

11: $\Delta^{t+1} = \dfrac{\sum_{u \in U^t} w_u \Delta_{u,\varepsilon}^{t+1}}{q_u W_u \times q_e W_e}$ 12: $\sigma \leftarrow \dfrac{z(|U|+1)\max(w_u)\beta}{q_u W_u \times q_e W_e}$ 13: $\theta^{t+1} \leftarrow \theta^t + \Delta^{t+1} + \mathcal{N}(0, I\sigma^2)$ 14:    $\mathcal{M}.\text{accum\_priv\_spending}(z)$
15: print $\mathcal{M}.\text{get\_priv\_spent}()$
16: Output: $(\varepsilon, \delta)$-UeDP $\theta$, $\mathcal{M}$
17: UeDP-Update $(u, S_u^t, \theta^t, \text{ClipFn})$:
18:     for each sample s in $S_u^t$ do
19:       $\theta \leftarrow \theta^t - \eta \nabla_t(\theta, s)$
20:       $\Delta_{u,s} = \theta - \theta^t$
21:     $\Delta_{u,\varepsilon} = \Sigma_{e \in E^t} w_e (\Sigma_{e \in S_{ue}^t} \Delta_{u,s})$
22:     return ClipFn$(\Delta_{u,\varepsilon,\beta})$
23: ClipFn$(\Delta, \beta)$:

24:     return $\pi(\Delta, \beta) = \Delta \cdot \min\left(1, \dfrac{\beta}{\|\Delta\|}\right)$ To summarize the algorithm, the user-entity differential privacy system 106 utilizes a natural language dataset D containing a set of users U and a set of sensitive entities E, and hyperparameters as inputs. The user-entity differential privacy system 106 initializes the parameters θ of the natural language model and a moments accountant $\mathcal{M}$ (line 2). At each iteration t, the user-entity differential privacy system 106 randomly samples $U^t$ users from U and $E^t$ sensitive entities from E with sampling rates $q_u$ and $q_e$, respectively (lines 7 and 9). The user-entity differential privacy system 106 utilizes all sensitive samples (e.g., sensitive data points) consisting of the sensitive entities $E^t$ and belonging to the users $U^t$ for training. The user-entity differential privacy system 106 determines gradients of model parameters for a particular user (line 10). The user-entity differential privacy system 106 clips the per-user gradients so that its l2-norm is bounded by a pre-defined gradient clipping bound β (lines 17-22). The user-entity differential privacy system 106 utilizes a weighted-average estimator $f_\varepsilon$ (a user-entity estimator) to compute an average gradient using the clipped gradients (line 11). The user-entity differential privacy system 106 also determines a noise scale σ for the estimator $f_\varepsilon$ based on a sensitivity bound of the estimator (line 12). Further, the user-entity differential privacy system 106 adds random Gaussian noise to the model update (line 13).

As further shown in the algorithm, the user-entity differential privacy system 106 utilizes the moments accountant $\mathcal{M}$ to determine the T training steps privacy budget consumption (lines 14-15). In some embodiments, use of the moments accountant facilitates user-entity differential privacy by bounding the total privacy loss of T steps of the Gaussian mechanism with the noise $\mathcal{N}(0, I\sigma^2)$. In other words, given the bounded sensitivity of the estimator $f_\varepsilon$, the user-entity differential privacy system 106 uses the moments accountant $\mathcal{M}$ to obtain a tight bound on the total privacy consumption of T steps of the Gaussian mechanism. Thus, the user-entity differential privacy system 106 provides a user-entity differential privacy (UeDP) guarantee. In some cases, the user-entity differential privacy system 106 determines that, for the estimator $f_\varepsilon$, the moments accountant $\mathcal{M}$ of the sampled Gaussian mechanism correctly computes the UeDP privacy loss with the scale $z = \sigma/\mathbb{S}(f_\varepsilon)$ for $f_\varepsilon$ for T training steps. In some instances, the user-entity differential privacy system 106 employs a moments accountant as described in Abadi, M. et al., *Deep Learning with Differential Privacy*, in ACM SIGSAC Conference on Computer and Communications Security, pp. 308-18, 2016, which is incorporated herein by reference in its entirety.

Thus, the user-entity differential privacy system 106 generates a natural language model that provides user-entity differential privacy to simultaneously protect the users and the sensitive entities represented by the underlying data. In some implementations, the user-entity differential privacy system 106 offers additional flexibility via configurability. For instance, in some cases, the user-entity differential privacy system 106 is configurable to only target protection of user participation information by setting $\|E-E'\|_1 = 0$ in the adjacent databases. Similarly, in some cases, the user-entity differential privacy system 106 is configurable to only target protection of sensitive entities by setting $\|U-U'\|_1 = 0$ in the adjacent databases. In some implementations, the user-entity differential privacy system 106 is further configurable in establishing the set of sensitive entities E to be protected. Indeed, in some instances, the user-entity differential privacy system 106 receives (e.g., via a client device) user input regarding one or more of the aforementioned configurability options. The user-entity differential privacy system 106 generates the natural language model in accordance with the selected configuration. Thus, the user-entity differential privacy system 106 operates more flexibly when compared to conventional systems that are limited to protecting pre-defined types of data.

As mentioned above, in one or more embodiments, the user-entity differential privacy system 106 generates a natural language model with an improved balance between security and model utility. In other words, the user-entity differential privacy system 106 generates a natural language model that accurately performs a natural language task while also providing strong data protection. Researchers have conducted studies to determine the interplay between model utility and data security provided by one or more embodiments of the user-entity differential privacy system 106.

Figure 5B:
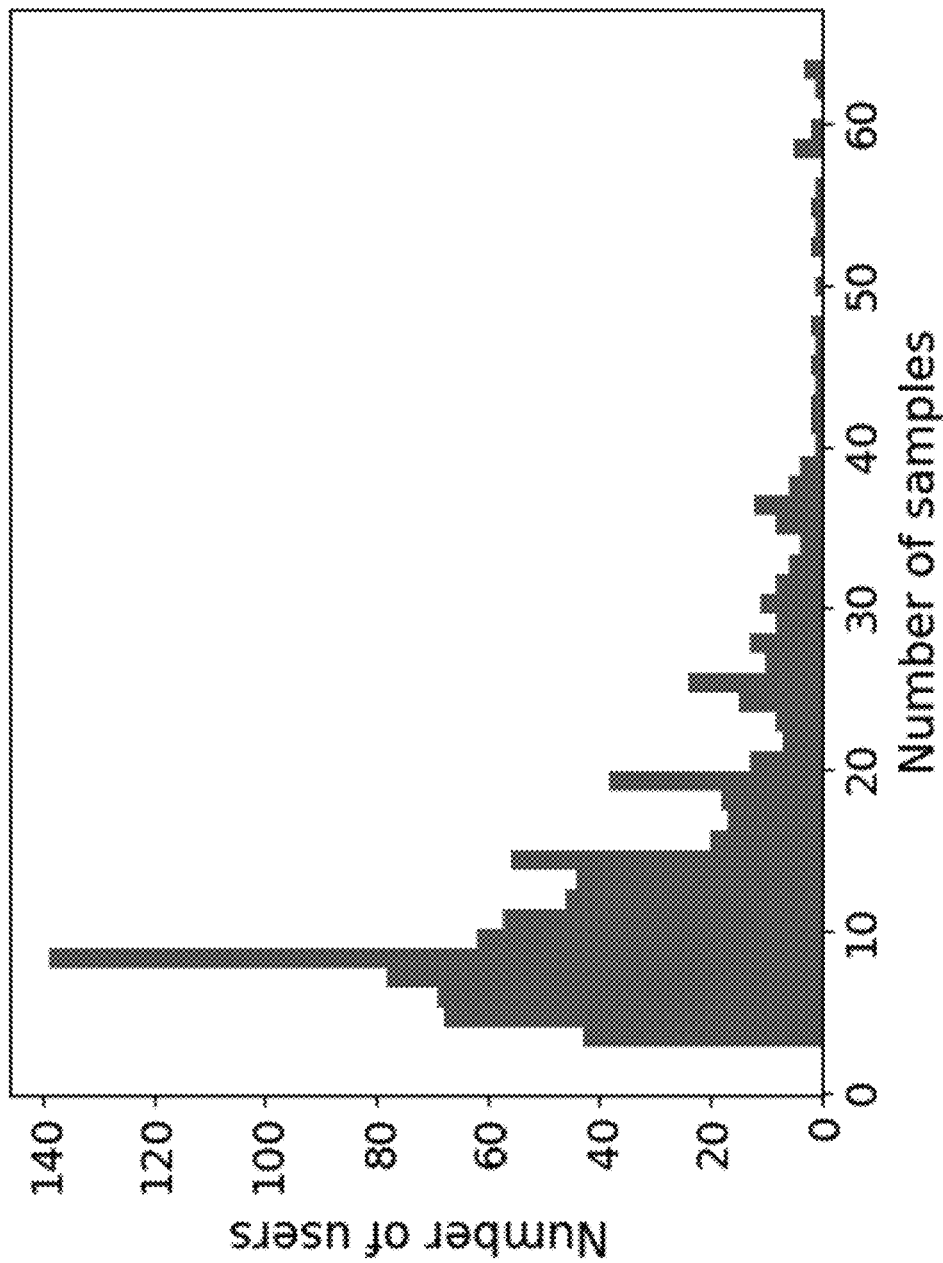

The researchers conducted the studies using the CONLL-2003 news dataset described in Sang, E. and De Meulder F., *Introduction to the Conll-2003 Shared Task: Language-independent Named Entity Recognition*, arXiv preprint cs/0306050, 2003. The CONLL-2003 dataset consists of news stories published between August 1996 and August 1997. It is a NER dataset having labels for four different types of named entities, including location, organization, person, and miscellaneous entities. FIGS. 5A-5B illustrate the data included in the CONLL-2003 dataset. In particular, FIG. 5A illustrates a table showing a breakdown of the data represented within the dataset. FIG. 5B illustrates a graph showing the distribution of data.

In the studies, the researchers included those organization and person entities within the set of sensitive entities. As the dataset does not provide obvious user information, the researchers considered each document as a user. The researchers further considered each sentence in a document as a separate sample for use in the natural language task. The researchers replaced all words that appeared less than three times within the dataset with a <unk> token.

Figure 6:
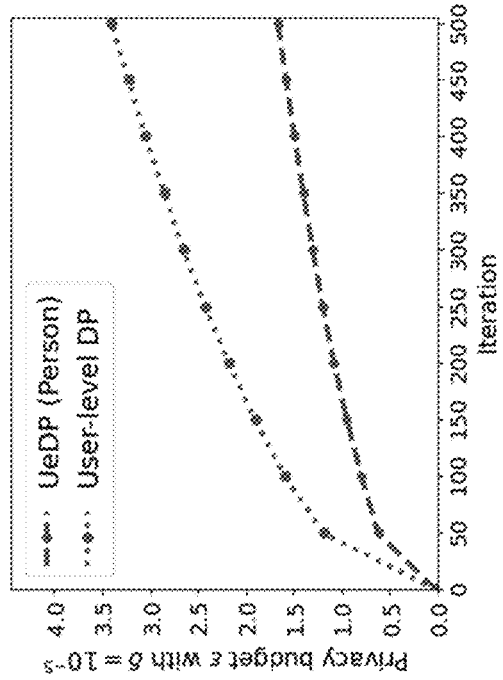
FIG. 6 illustrates graphs reflecting experimental results regarding the privacy budget consumption of the user-entity differential privacy system in accordance with one or more embodiments.
Figure 6:
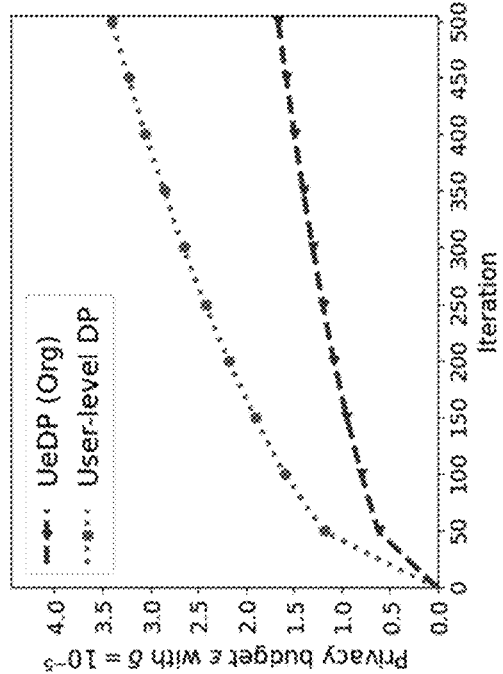
Figure 6:
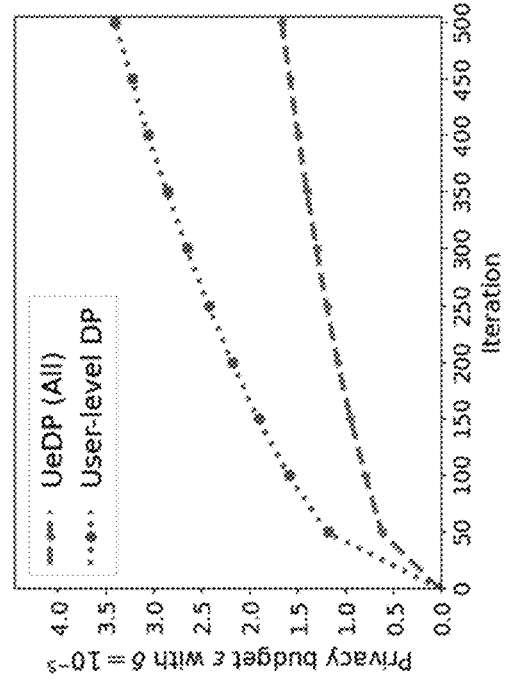
Figure 7:
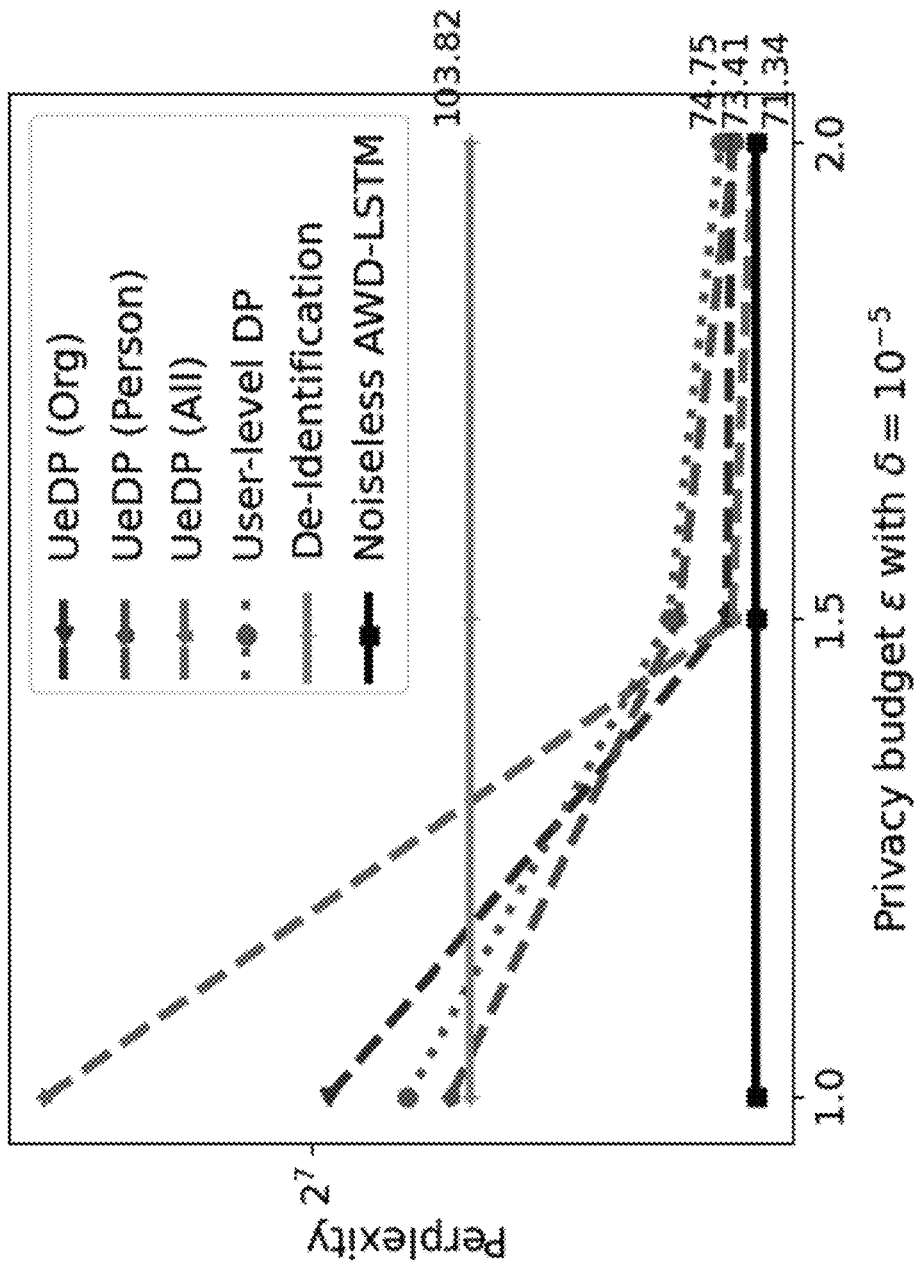
FIG. 7 illustrates a graph reflecting experimental results regarding the model utility of a natural language model generated by the user-entity differential privacy system in accordance with one or more embodiments.

FIGS. 6-7 illustrate graphs reflecting experimental results regarding the effectiveness of the user-entity differential privacy system 106 in generating a natural language model that provides user-entity differential privacy in accordance with one or more embodiments. The graphs reflect performance in generating a natural language model for performing a next word prediction task. As shown, the researchers measured both the privacy budget of the user-entity differential privacy system 106 in generating the natural language model as well as the next word prediction results.

As shown by the graphs in FIGS. 6-7, the researchers compared the performance of one or more embodiments of the user-entity differential privacy system 106 (labeled "UeDP") with various other models, including both noise-less and privacy-preserving mechanism (either user level or entity level). For instance, the graphs show comparisons with the User-level DP model described in McMahan et al., 2017, referenced above. Further, the graphs show a comparison with the De-Identification model used for protecting sensitive entities as described in Dernoncourt, F. et al., *De-identification of Patient Notes with Recurrent Neural Networks*, Journal of the American Medical Informatics Association, 24(3):596-606, 2017. The graphs also show a comparison with the noiseless ASGD Weight-Dropped LSTM model (labelled "Noiseless AWD-LSTM") described in Merity, S. et al., *Regularizing and Optimizing LSTM Language Models*, arXiv preprint arXiv: 1708.02182, 2017. To researchers applied the UeDP, User-level DP, and De-Identification approaches to the Noiseless AWD-LSTM model during the training process.

The graphs of FIG. 6 compare the privacy budget consumed by one or more embodiments of the user-entity differential privacy system 106 to the privacy budget consumed by the User-level DP model through various iterations of training a model where $\delta=10^{-5}$. In particular, the graphs of FIG. 6 illustrate performance of the one or more embodiments of the user-entity differential privacy system 106 where the set of sensitive entities targeted for protection include (i) organization entities, (ii) person entities, and (iii) all entities represented within the CONLL-2003 dataset.

As shown by the graphs of FIG. 6, the user-entity differential privacy system 106 achieves a tighter privacy budget than the User-level DP model in all scenarios. As discussed above, a smaller privacy budget (represented as E in equation 2) corresponds to a stronger privacy guarantee. Accordingly, the graphs of FIG. 6 illustrate that the user-entity differential privacy system 106 provides more robust security of the data used to train a model. As further shown, the gap between the privacy budget consumed by each model increases proportionally with the number of training steps, indicating that the user-entity differential privacy system 106 operates more efficiently with regards to the privacy budget in scenarios where more lengthy training is utilized. This is particularly noteworthy as the user-entity differential privacy system 106 provides protection for both user participation information as well as sensitive entities while the User-level DP model only provides user protection.

The graph of FIG. 7 compares the performance of each tested model on the next word prediction task. The graph measures the performance using perplexity, which provides the exponential of the average negative log-likelihood. Perplexity is defined as $PP=2^{-\Sigma_{x \in D} p(x) \log p(x)}$ where x represents a sequence of words in a sentence $x=x_1, x_2, \ldots x_{m_u}$, $m_u$ is the length of x, and p(x) is a probability to predict the next word $x_{j+1}$ in x. In the first word prediction task, the first j words in x are used to predict the next word $x_{j+1}$. Perplexity is considered the exponential of the cross-entropy loss of the natural language model. Accordingly, a lower perplexity indicates a more accurate model. The graph of FIG. 7 illustrates perplexity as a function of the privacy budget.

As shown by the graph of FIG. 7, the user-entity differential privacy system 106 typically achieves a better perplexity compared to the User-level DP model. Also, from $\epsilon>1$, the user-entity differential privacy system 106 achieves better perplexity than the De-Identification model. In De-Identification, sensitive entities are marked, resulting in smaller model sensitivity. The De-Identification model, however, provides no privacy guarantee to users or sensitive entities while the user-entity differential privacy system 106 provides differential privacy guarantees for both, allowing for more robust data security.

In higher privacy budgets, the performance of the user-entity differential privacy system 106 approaches the upper bound of the Noiseless AWD-LSTM model. The Noiseless AWD-LSTM model can be considered an upper-bound performance mechanism as it operates without providing any privacy protection. Thus, achieving a comparable perplexity while providing protection for both users and sensitive entities is significant.

Accordingly, the user-entity differential privacy system 106 provides advantages for both data security and model utility. Indeed, as shown by the graphs of FIGS. 6, the user-entity differential privacy system 106 consumes less privacy budget, leading to better privacy guarantees. Further, as shown by the graph of FIG. 7, the user-entity differential privacy system 106 produces a natural language model that performs a natural language task with an accuracy that approaches comparability with a model that provides no data security.

Figure 8:
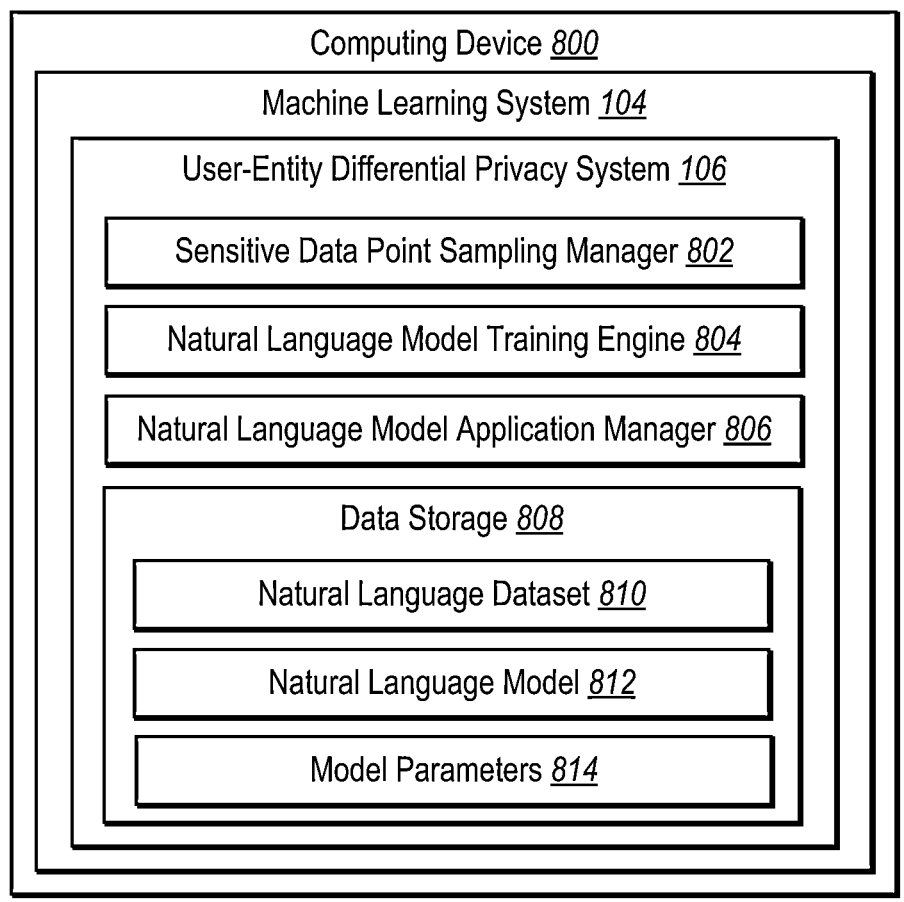
FIG. 8 illustrates an example schematic diagram of a user-entity differential privacy system in accordance with one or more embodiments.

Turning now to FIG. 8, additional detail will now be provided regarding various components and capabilities of the user-entity differential privacy system 106. In particular, FIG. 8 illustrates the user-entity differential privacy system 106 implemented by the computing device 800 (e.g., the server(s) 102 and/or one of the client devices 110a-110n discussed above with reference to FIG. 1). Additionally, the user-entity differential privacy system 106 is also part of the machine learning system 104. As shown, in one or more embodiments, the user-entity differential privacy system 106 includes, but is not limited to, a sensitive data point sampling manager 802, a natural language model training engine 804, a natural language model application manager 806, and data storage 808 (which includes a natural language dataset 810, a natural language model 812, and model parameters 814).

As just mentioned, and as illustrated in FIG. 8, the user-entity differential privacy system 106 includes the sensitive data point sampling manager 802. In one or more embodiments, the sensitive data point sampling manager 802 determines a set of sensitive data points from a natural language dataset. For instance, in some cases, the sensitive data point sampling manager 802 determines users to represent within the set of sensitive data points by sampling from all users represented in the natural language database using a user sampling rate. Further, the sensitive data point sampling manager 802 determines sensitive entities to represent within the set of sensitive data points by sampling from all sensitive data points included in the natural language dataset using a sensitive entity sampling rate. Accordingly, the sensitive data point sampling manager 802 selects, from the natural language dataset, sensitive data points that are associated with the determined users and include reference to the determined sensitive entities.

As further shown in FIG. 8, the user-entity differential privacy system 106 includes the natural language model training engine 804. In one or more embodiments, the natural language model training engine 804 generates (e.g., trains) a natural language model that provides user-entity differential privacy. For instance, in some cases, the natural language model training engine 804 generates the natural language model utilizing the set of sensitive data points determined by the sensitive data point sampling manager 802. To illustrate, in one or more embodiments, the natural language model training engine 804 determines an average gradient corresponding to the set of sensitive data points using a user-entity estimator, generates a noise scale for the user-entity estimator, and generates parameters for the natural language model using the average gradient and the noise scale. In some cases, the natural language model training engine 804 generates the natural language model via an iterative process (e.g., by iteratively modifying/refining the parameters).

Additionally, as shown in FIG. 8, the user-entity differential privacy system 106 includes the natural language model application manager 806. In one or more embodiments, the natural language model application manager 806 implements the natural language model generated by the natural language model training engine 804. For instance, in some cases, the natural language model application manager 806 utilizes the natural language model to perform a natural language task (e.g., the natural language task for which the natural language model was trained).

Further, as shown, the user-entity differential privacy system 106 includes data storage 808. In particular, data storage 808 includes the natural language dataset 810, the natural language model 812, and model parameters 814. In one or more embodiments, the natural language dataset 810 stores the natural language dataset used for generating a natural language model. For instance, in some cases, the sensitive data point sampling manager 802 selects a set of sensitive data points for use in generating a natural language model from the natural language dataset 810. In some implementations, the natural language model 812 stores the natural language model generated by the natural language model training engine 804 and implemented by the natural language model application manager 806. Further, in some embodiments, model parameters 814 stores the parameters generated for the natural language model. To illustrate, in some cases, the natural language model 812 stores the natural language model itself while model parameters 814 more specifically stores the parameters used for implementation of the natural language model.

Each of the components 802-814 of the user-entity differential privacy system 106 can include software, hardware, or both. For example, the components 802-814 can include one or more instructions stored on a computer-readable storage medium and executable by processors of one or more computing devices, such as a client device or server device. When executed by the one or more processors, the computer-executable instructions of the user-entity differential privacy system 106 can cause the computing device(s) to perform the methods described herein. Alternatively, the components 802-814 can include hardware, such as a special-purpose processing device to perform a certain function or group of functions. Alternatively, the components 802-814 of the user-entity differential privacy system 106 can include a combination of computer-executable instructions and hardware.

Furthermore, the components 802-814 of the user-entity differential privacy system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-814 of the user-entity differential privacy system 106 may be implemented as a stand-alone application, such as a desktop or mobile application. Furthermore, the components 802-814 of the user-entity differential privacy system 106 may be implemented as one or more web-based applications hosted on a remote server. Alternatively, or additionally, the components 802-814 of the user-entity differential privacy system 106 may be implemented in a suite of mobile device applications or "apps." For example, in one or more embodiments, the user-entity differential privacy system 106 can comprise or operate in connection with digital software applications such as ADOBE® MAGENTO® COMMERCE, ADOBE® DOCUMENT CLOUD®, ADOBE® ACROBAT®, ADOBE® SENSEI®. "ADOBE," "MAGENTO," "DOCUMENT CLOUD," "ACROBAT®," and "ADOBE SENSEI®" are either registered trademarks or trademarks of Adobe Inc. in the United States and/or other countries.

Figure 9:
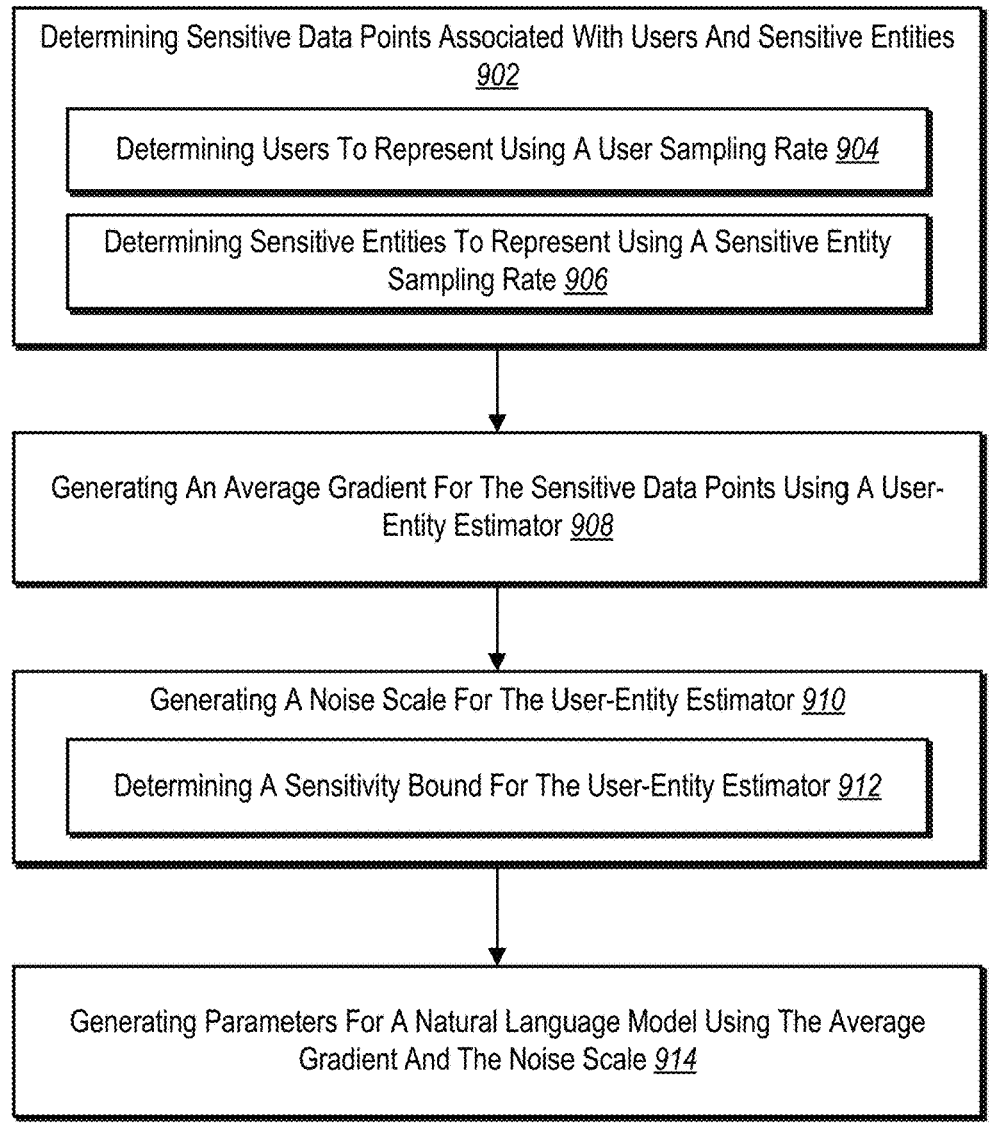
FIG. 9 illustrates a flowchart of a series of acts for generating a natural language model that provides user-entity differential privacy in accordance with one or more embodiments.

FIGS. 1-8, the corresponding text and the examples provide a number of different methods, systems, devices, and non-transitory computer-readable media of the user-entity differential privacy system 106. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating a natural language model that provides user-entity differential privacy in accordance with one or more embodiments. While FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed, in a digital medium environment for natural language processing, as part of a computer-implemented method for implementing differential privacy that protects data owners and sensitive textual information (e.g., sensitive entities) within textual datasets. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device comprising a natural language dataset comprising a plurality of natural language texts corresponding to a plurality of users and comprising one or more sensitive entities; and a natural language model. The system further includes at least one processor configured to cause the system to perform the acts of FIG. 9.

The series of acts 900 includes an act 902 of determining sensitive data points associated with users and sensitive entities. For instance, in some embodiments, the act 902 involves determining, from a natural language dataset, a set of sensitive data points associated with one or more users and comprising at least one sensitive entity.

As shown in FIG. 9, the act 902 includes a sub-act 904 of determining users to represent using a user sampling rate. To illustrate, in one or more embodiments, the sub-act 904 involves determining the one or more users to represent in the set of sensitive data points from a plurality of users associated with the natural language dataset using a user sampling rate.

As further shown in FIG. 9, the act 902 also includes a sub-act 906 of determining sensitive entities to represent using a sensitive entity sampling rate. For instance, in some cases, the sub-act 906 involves determining the at least one sensitive entity to represent in the set of sensitive data points from a plurality of sensitive entities included in the natural language dataset using a sensitive entity sampling rate.

Further, the series of acts 900 includes an act 908 of generating an average gradient for the sensitive data points using a user-entity estimator. For example, in one or more embodiments, the act 908 involves generating, utilizing the set of sensitive data points, a natural language model that provides user-entity differential privacy for the one or more users and the at least one sensitive entity by determining an average gradient corresponding to the set of sensitive data points using a user-entity estimator. In one or more embodiments, determining the average gradient corresponding to the set of sensitive data points using the user-entity estimator comprises determining the average gradient utilizing a user sampling rate, a sensitive entity sampling rate, a first set of weights corresponding to the one or more users, and a second set of weights corresponding to the at least one sensitive entity.

In some implementations, the user-entity differential privacy system 106 determines, for each user of the one or more users, one or more gradients corresponding to a set of parameters of the natural language model using the set of sensitive data points. Accordingly, in some cases, the user-entity differential privacy system 106 determines the average gradient corresponding to the set of sensitive data points using the user-entity estimator by determining the average gradient using the user-entity estimator and the one or more gradients determined for each user.

In some embodiments, determining, for each user of the one or more users, the one or more gradients corresponding to the set of parameters of the natural language model using the set of sensitive data points comprises determining the one or more gradients for a user of the one or more users by: determining, for each sensitive data sample associated with the user, a gradient value; and generating one or more bounded gradients utilizing a clipping model and the gradient value determined for each sensitive data sample.

In some instances, determining, for each user of the one or more users, the one or more gradients corresponding to the set of parameters of the natural language model using the set of sensitive data points comprises: determining, utilizing the natural language model, model predictions based on the set of sensitive data points; and determining the one or more gradients based on the model predictions.

Additionally, the series of acts 900 includes an act 910 of generating a noise scale for the user-entity estimator. To illustrate, in some implementations, the act 910 involves generating, utilizing the set of sensitive data points, the natural language model that provides user-entity differential privacy for the one or more users and the at least one sensitive entity by further determining a noise scale for the user-entity estimator.

As shown in FIG. 9, the act 910 includes a sub-act 912 of determining a sensitivity bound for the user-entity estimator. For example, in some embodiments, the user-entity differential privacy system 106 determines a sensitivity bound for the user-entity estimator utilizing a user sampling rate, a sensitive entity sampling rate, a first set of weights corresponding to the one or more users, and a second set of weights corresponding to the at least one sensitive entity. Accordingly, the user-entity differential privacy system 106 determines the noise scale for the user-entity estimator by determining the noise scale utilizing the sensitivity bound for the user-entity estimator.

The series of acts 900 further includes an act 914 of generating parameters for a natural language model using the average gradient and the noise scale. For instance, in some cases, the act 914 involves generating, utilizing the set of sensitive data points, the natural language model that provides user-entity differential privacy for the one or more users and the at least one sensitive entity by further generating parameters for the natural language model using the average gradient and the noise scale.

In some implementations, generating the parameters for the natural language model using the average gradient and the noise scale comprises modifying the parameters (e.g., the set of parameters) of the natural language model using the average gradient and the noise scale. For example, in some cases the natural language model has parameters that were previously initialized or modified (e.g., as part of an iterative process). Accordingly, the user-entity differential privacy system 106 can modify the parameters to refine the operation of the natural language model and/or improve the security provided by the natural language model.

In one or more embodiments, generating the natural language model that provides the user-entity differential privacy for the one or more users and the at least one sensitive entity comprises generating the natural language model that generates outcomes in accordance with a user-entity differential privacy rule that corresponds to user-entity adjacent databases.

In some implementations, the series of acts 900 further includes acts for further modifying the parameters of the natural language model. Indeed, as suggested above, in some implementations, the user-entity differential privacy system 106 generates (e.g., trains) the natural language model through an iterative process. Thus, through the iterative process, the user-entity differential privacy system 106 updates/modifies the parameters of the natural language model. To illustrate, in some embodiments, the acts include determining, from the natural language dataset, an additional set of sensitive data points associated with one or more additional users and comprising at least one additional sensitive entity; and modifying the parameters of the natural language model to provide the user-entity differential privacy utilizing the additional set of sensitive data points.

To provide an illustration, in one or more embodiments, the user-entity differential privacy system 106 determines, from a natural language dataset, a set of sensitive data points associated with one or more users and comprising at least one sensitive entity; generates, for each user of the one or more users, a gradient corresponding to one or more parameters of a natural language model using the set of sensitive data points; determines an average gradient using a user-entity estimator and the gradient for each user of the one or more users; generates a noise scale for the user-entity estimator; and modifies, utilizing the average gradient and the noise scale, the one or more parameters of the natural language model to provide user-entity differential privacy for the one or more users and the at least one sensitive entity.

In some instances, the user-entity differential privacy system 106 determines the average gradient using the user-entity estimator and the gradient for each user of the one or more users by determining the average gradient using the gradient for each user, a user sampling rate, a sensitive entity sampling rate, a first set of weights corresponding to the one or more users, and a second set of weights corresponding to the at least one sensitive entity; and generates the noise scale for the user-entity estimator by generating the noise scale utilizing the user sampling rate, the sensitive entity sampling rate, the first set of weights, and the second set of weights.

In some cases, the user-entity differential privacy system 106 determines that a first database and a second database are user-entity adjacent databases if data of the first database and data of the second database differs by a single user and a single sensitive entity. Accordingly, in some implementations, the user-entity differential privacy system 106 modifies the one or more parameters of the natural language model to provide the user-entity differential privacy for the one or more users and the at least one sensitive entity by modifying the one or more parameters to cause the natural language model to generate outcomes in accordance with a user-entity differential privacy rule that corresponds to the user-entity adjacent databases.

In some instances, the user-entity differential privacy system 106 generates Gaussian noise utilizing the noise scale. Accordingly, in some implementations, the user-entity differential privacy system 106 modifies, utilizing the average gradient and the noise scale, the one or more parameters of the natural language model by modifying the one or more parameters of the natural language model utilizing the average gradient and the Gaussian noise.

In one or more embodiments, the user-entity differential privacy system 106 receives, from a client device, a set of sensitive entities to be protected. Accordingly, in some implementations, the user-entity differential privacy system 106 determine the set of sensitive data points comprising the at least one sensitive entity by determining natural language texts that reference a sensitive entity from the set of sensitive entities.

To provide another illustration, in one or more embodiments, the user-entity differential privacy system 106 determines, from a natural language dataset, a set of sensitive data points associated with one or more users and comprising at least one sensitive entity; generates, for each user of the one or more users, a gradient corresponding to one or more parameters of the natural language model using the set of sensitive data points; determines an average gradient using a user-entity estimator and the gradient for each user of the one or more users; generates, for the user-entity estimator and utilizing a user sampling rate and a sensitive entity sampling rate, Gaussian noise that provides user-entity differential privacy for the plurality of users and the one or more sensitive entities; and modifies, utilizing the average gradient and the Gaussian noise, the one or more parameters of the natural language model.

In some implementations, the user-entity differential privacy system 106 determines the set of sensitive data points comprising the at least one sensitive entity by determining natural language texts that reference at least one of personal identification information, a location, an organization, or a medical symptom.

In one or more embodiments, the user-entity differential privacy system 106 generates the Gaussian noise that provides the user-entity differential privacy by: determining a sensitivity bound for the user-entity estimator utilizing the user sampling rate and the sensitive entity sampling rate; generating a noise scale for the user-entity estimator utilizing the sensitivity bound for the user-entity estimator; and generating the Gaussian noise utilizing the noise scale. In some cases, determining the sensitivity bound for the user-entity estimator utilizing the user sampling rate and the sensitive entity sampling rate comprises determining the sensitivity bound further based on a first set of weights corresponding to the one or more users and a second set of weights corresponding to the at least one sensitive entity.

In some cases, the user-entity differential privacy system 106 further receives, via a client device, input to focus a protection of the natural language model on the plurality of users or the one or more sensitive entities; and modifies, utilizing the natural language dataset, the one or more parameters of the natural language model to focus the protection based on the input.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
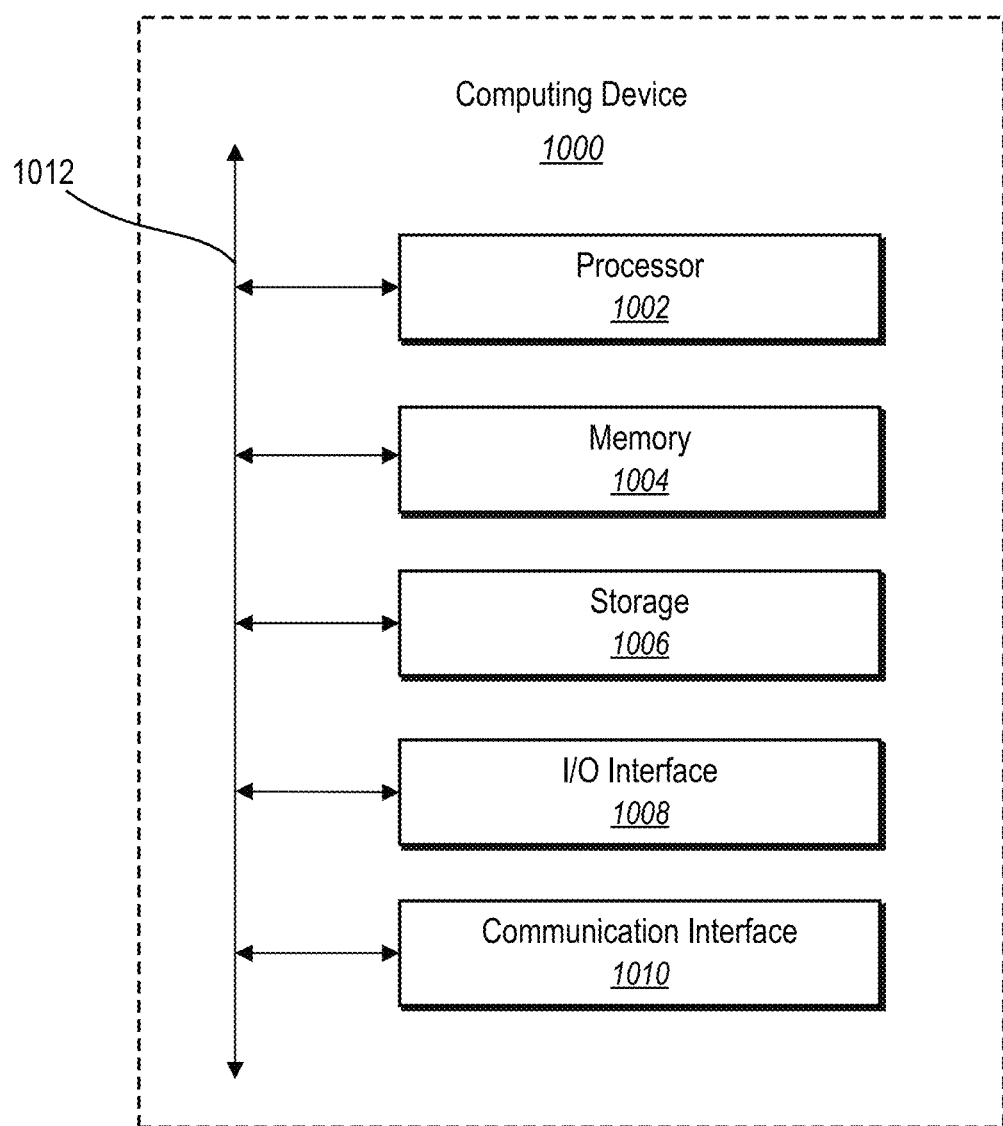
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102 and/or the client devices 110a-110n). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for natural language processing, a computer-implemented method for implementing differential privacy that protects data owners and sensitive textual information within textual datasets comprising:

determining a set of sensitive data points based on sampled users and sampled sensitive entities from a natural language dataset, wherein each sensitive data point is associated with at least one sampled user and comprises at least one sampled sensitive entity; and generating, utilizing the set of sensitive data points, a natural language model that simultaneously provides protection for users and sensitive entities represented within the natural language dataset via user-entity differential privacy by:

determining an average gradient corresponding to the set of sensitive data points using a user-entity estimator;

determining a noise scale for the user-entity estimator based on the sampled users and the sampled sensitive entities associated with the set of sensitive data points; and generating parameters for the natural language model using the average gradient and the noise scale.

2. The computer-implemented method of claim 1, wherein generating the natural language model that simultaneously provides protection for the users and the sensitive entities represented within the natural language dataset via the user-entity differential privacy comprises generating the natural language model that generates outcomes in accordance with a user-entity differential privacy rule that corresponds to user-entity adjacent databases.

3. The computer-implemented method of claim 1, further comprising determining a sensitivity bound for the user-entity estimator utilizing a user sampling rate, a sensitive entity sampling rate, a first set of weights corresponding to the at least one sampled user, and a second set of weights corresponding to the at least one sampled sensitive entity, wherein determining the noise scale for the user-entity estimator comprises determining the noise scale utilizing the sensitivity bound for the user-entity estimator.

4. The computer-implemented method of claim 1, further comprising determining, for each user of the at least one sampled user, one or more gradients corresponding to a set of parameters of the natural language model using the set of sensitive data points, wherein determining the average gradient corresponding to the set of sensitive data points using the user-entity estimator comprises determining the average gradient using the user-entity estimator and the one or more gradients determined for each user.

5. The computer-implemented method of claim 4, wherein generating the parameters for the natural language model using the average gradient and the noise scale comprises modifying the set of parameters of the natural language model using the average gradient and the noise scale.

6. The computer-implemented method of claim 4, wherein determining, for each user of the at least one sampled user, the one or more gradients corresponding to the set of parameters of the natural language model using the set of sensitive data points comprises determining the one or more gradients for a user of the at least one sampled user by:

determining, for each sensitive data sample associated with the user, a gradient value; and generating one or more bounded gradients utilizing a clipping model and the gradient value determined for each sensitive data sample.

7. The computer-implemented method of claim 4, wherein determining, for each user of the at least one sampled user, the one or more gradients corresponding to the set of parameters of the natural language model using the set of sensitive data points comprises:

determining, utilizing the natural language model, model predictions based on the set of sensitive data points; and determining the one or more gradients based on the model predictions.

8. The computer-implemented method of claim 1, wherein determining the average gradient corresponding to the set of sensitive data points using the user-entity estimator comprises determining the average gradient utilizing a user sampling rate, a sensitive entity sampling rate, a first set of weights corresponding to the at least one sampled user, and a second set of weights corresponding to the at least one sampled sensitive entity.

9. The computer-implemented method of claim 1, further comprising:

determining the at least one sampled user to represent in the set of sensitive data points from a plurality of users associated with the natural language dataset using a user sampling rate; and determining the at least one sampled sensitive entity to represent in the set of sensitive data points from a plurality of sensitive entities included in the natural language dataset using a sensitive entity sampling rate.

10. The computer-implemented method of claim 1, further comprising:

determining, from the natural language dataset, an additional set of sensitive data points associated with one or more additional sampled users and comprising at least one additional sampled sensitive entity; and modifying the parameters of the natural language model to provide the user-entity differential privacy utilizing the additional set of sensitive data points.

11. A non-transitory computer-readable medium storing instructions thereon that, when executed by at least one processor, cause the at least one processor to perform operations comprising:

determining a set of sensitive data points based on sampled users and sampled sensitive entities from a natural language dataset, wherein each sensitive data point is associated with at least one sampled user and comprises at least one sampled sensitive entity;

generating, for each user of the at least one sampled user, a gradient corresponding to one or more parameters of a natural language model using the set of sensitive data points;

determining an average gradient using a user-entity estimator and the gradient for each user of the at least one sampled user;

generating a noise scale for the user-entity estimator based on the sampled users and the sampled sensitive entities associated with the set of sensitive data points; and modifying, utilizing the average gradient and the noise scale, the one or more parameters of the natural language model to simultaneously provide protection for users and sensitive entities represented within the natural language dataset via user-entity differential privacy.

12. The non-transitory computer-readable medium of claim 11, wherein:

the operations further comprise determining that a first database and a second database are user-entity adjacent databases if data of the first database and data of the second database differs by a single user and a single sensitive entity; and modifying the one or more parameters of the natural language model to simultaneously provide protection for users and sensitive entities represented within the natural language dataset via the user-entity differential privacy comprises modifying the one or more parameters to cause the natural language model to generate outcomes in accordance with a user-entity differential privacy rule that corresponds to the user-entity adjacent databases.

13. The non-transitory computer-readable medium of claim 11, wherein:

the operations further comprise generating Gaussian noise utilizing the noise scale; and modifying, utilizing the average gradient and the noise scale, the one or more parameters of the natural language model comprises modifying the one or more parameters of the natural language model utilizing the average gradient and the Gaussian noise.

14. The non-transitory computer-readable medium of claim 11, wherein:

determining the average gradient using the user-entity estimator and the gradient for each user of the at least one sampled user comprises determining the average gradient using the gradient for each user, a user sampling rate, a sensitive entity sampling rate, a first set of weights corresponding to at least one sampled user, and a second set of weights corresponding to the at least one sampled sensitive entity; and generating the noise scale for the user-entity estimator comprises generating the noise scale utilizing the user sampling rate, the sensitive entity sampling rate, the first set of weights, and the second set of weights.

15. The non-transitory computer-readable medium of claim 11, wherein:

receiving, from a client device, a set of sensitive entities to be protected; and determining the set of sensitive data points comprising the at least one sampled sensitive entity comprises determining natural language texts that reference a sensitive entity from the set of sensitive entities.

16. A system comprising:

at least one memory device comprising:

a natural language dataset comprising a plurality of natural language texts corresponding to a plurality of users and comprising one or more sensitive entities; and a natural language model; and at least one processor configured to cause the system to:

determine a set of sensitive data points based on sampled users and one or more sampled sensitive entities from the natural language dataset, wherein each sensitive data point is associated with at least one sampled user and comprises at least one sampled sensitive entity;

generate, for each user of the at least one sampled user, a gradient corresponding to one or more parameters of the natural language model using the set of sensitive data points;

determine an average gradient using a user-entity estimator and the gradient for each user of the at least one sampled user;

generate, for the user-entity estimator and utilizing a user sampling rate used in sampling the sampled users associated with the set of sensitive data points and a sensitive entity sampling rate used in sampling the one or more sampled sensitive entities associated with the set of sensitive data points, Gaussian noise that simultaneously provides protection for users and sensitive entities represented within the natural language dataset via user-entity differential privacy; and modify, utilizing the average gradient and the Gaussian noise, the one or more parameters of the natural language model.

17. The system of claim 16, wherein the at least one processor is configured to cause the system to generate the Gaussian noise that provides the user-entity differential privacy by:

determining a sensitivity bound for the user-entity estimator utilizing the user sampling rate and the sensitive entity sampling rate;

generating a noise scale for the user-entity estimator utilizing the sensitivity bound for the user-entity estimator; and generating the Gaussian noise utilizing the noise scale.

18. The system of claim 17, wherein determining the sensitivity bound for the user-entity estimator utilizing the user sampling rate and the sensitive entity sampling rate comprises determining the sensitivity bound further based on a first set of weights corresponding to the at least one sampled user and a second set of weights corresponding to the at least one sampled sensitive entity.

19. The system of claim 16, wherein the at least one processor is configured to cause the system to determine the set of sensitive data points comprising the at least one sampled sensitive entity by determining natural language texts that reference at least one of personal identification information, a location, an organization, or a medical symptom.

20. The system of claim 16, wherein the at least one processor is further configured to cause the system to:

receive, via a client device, input to focus a protection of the natural language model on the plurality of users or the one or more sensitive entities; and modify, utilizing the natural language dataset, the one or more parameters of the natural language model to focus the protection based on the input.

* * * * *